(12) United States Patent
Oishi et al.

(10) Patent No.: US 11,645,845 B2
(45) Date of Patent: May 9, 2023

(54) DEVICE AND METHOD FOR DETECTING DISPLAY OF PROVIDED CREDIT, AND PROGRAM

(71) Applicant: NIPPON TELEGRAPH AND TELEPHONE CORPORATION, Tokyo (JP)

(72) Inventors: Yasunori Oishi, Tokyo (JP); Takahito Kawanishi, Tokyo (JP); Kaoru Hiramatsu, Tokyo (JP); Kunio Kashino, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 12 days.

(21) Appl. No.: 16/972,267

(22) PCT Filed: Jun. 3, 2019

(86) PCT No.: PCT/JP2019/021932
§ 371 (c)(1),
(2) Date: Dec. 4, 2020

(87) PCT Pub. No.: WO2019/235407
PCT Pub. Date: Dec. 12, 2019

(65) Prior Publication Data
US 2021/0241324 A1    Aug. 5, 2021

(30) Foreign Application Priority Data

Jun. 5, 2018  (JP) .............................. JP2018-108011

(51) Int. Cl.
*H04N 21/439* (2011.01)
*G06V 20/40* (2022.01)
(Continued)

(52) U.S. Cl.
CPC ............ *G06V 20/46* (2022.01); *H04H 60/37* (2013.01); *H04N 21/2187* (2013.01);
(Continued)

(58) Field of Classification Search
CPC ........... H04N 21/4394; H04N 21/2393; H04N 21/4821; H04N 21/8586; H04N 21/812
(Continued)

(56) References Cited

U.S. PATENT DOCUMENTS

2002/0069408 A1* 6/2002 Abe ...................... H04H 60/63
                                                           348/E7.063
2009/0006193 A1* 1/2009 Forbes ............... G06Q 30/0269
                                                           705/40

FOREIGN PATENT DOCUMENTS

JP         2000322076 A      11/2000

* cited by examiner

*Primary Examiner* — Michael H Hong

(57) ABSTRACT

The present invention enables detection of a sponsorship credit display in a broadcast program with higher precision. A sponsorship credit display detection device 100 according to the present invention includes: a CM segment detection unit 120 that extracts a cut point, which is a time point where a frame in which the volume of an audio signal of a broadcast program is less than a volume threshold value and the amount of change from a previous frame is at least a pixel change threshold value is played, and detects a CM segment by comparing an interval of the extracted cut point with a CM defined length; a sponsorship credit display segment estimation unit 130 that estimates, as a sponsorship credit display segment, a predetermined time period before or after at least one continuous CM segment detected by the CM segment detection unit 120; and an output unit 140 that outputs information indicating the sponsorship credit display segment.

20 Claims, 15 Drawing Sheets

(51) Int. Cl.
  *H04N 21/234*   (2011.01)
  *H04H 60/37*    (2008.01)
  *H04N 21/2187*  (2011.01)
  *G06N 20/00*    (2019.01)
  *G06F 3/16*     (2006.01)
  *G06Q 30/0272*  (2023.01)

(52) U.S. Cl.
  CPC ... *H04N 21/23418* (2013.01); *H04N 21/4394* (2013.01); *G06F 3/165* (2013.01); *G06N 20/00* (2019.01); *G06Q 30/0272* (2013.01)

(58) Field of Classification Search
  USPC .................................. 725/32, 34, 36, 37, 42
  See application file for complete search history.

Fig. 13

[{'WordName': '<sp>', 'WordID': 82551, 'WordStartTime': 1230.109985, 'WordEndTime': 1230.189941,
{'WordName': 'ここ', 'WordID': 106781, 'WordStartTime': 1230.189941, 'WordEndTime': 1231.26001,
{'WordName': 'から', 'WordID': 99661, 'WordStartTime': 1231.26001, 'WordEndTime': 1231.530029,
{'WordName': 'は', 'WordID': 137091, 'WordStartTime': 1231.530029, 'WordEndTime': 1231.689941,
{'WordName': '<sp>', 'WordID': 82551, 'WordStartTime': 1231.689941, 'WordEndTime': 1231.839966,
{'WordName': '[え一]', 'WordID': 82556, 'WordStartTime': 1231.839966, 'WordEndTime': 1231.880005,
{'WordName': '<sp>', 'WordID': 82551, 'WordStartTime': 1231.880005, 'WordEndTime': 1231.910034,
{'WordName': 'ご覧', 'WordID': 109165, 'WordStartTime': 1231.910034, 'WordEndTime': 1232.329956,
{'WordName': 'の', 'WordID': 135996, 'WordStartTime': 1232.329956, 'WordEndTime': 1232.459961,
{'WordName': 'スポンサー', 'WordID': 217740, 'WordStartTime': 1232.459961, 'WordEndTime': 1232.9
{'WordName': 'の', 'WordID': 135996, 'WordStartTime': 1232.98999, 'WordEndTime': 1233.130005,
{'WordName': '提供', 'WordID': 415033, 'WordStartTime': 1233.130005, 'WordEndTime': 1233.589966,
{'WordName': 'で', 'WordID': 127769, 'WordStartTime': 1233.589966, 'WordEndTime': 1233.75,
{'WordName': '<sp>', 'WordID': 82551, 'WordStartTime': 1233.75, 'WordEndTime': 1233.910034,
{'WordName': '[え一]', 'WordID': 82556, 'WordStartTime': 1233.910034, 'WordEndTime': 1233.939941,
{'WordName': '<sp>', 'WordID': 82551, 'WordStartTime': 1233.939941, 'WordEndTime': 1233.969971,
{'WordName': 'お', 'WordID': 91844, 'WordStartTime': 1233.969971, 'WordEndTime': 1234.0,
{'WordName': '送り', 'WordID': 530289, 'WordStartTime': 1234.0, 'WordEndTime': 1234.359985,
{'WordName': 'します', 'WordID': 112908, 'WordStartTime': 1234.359985, 'WordEndTime': 1234.75,
{'WordName': '<sp>', 'WordID': 82551, 'WordStartTime': 1234.75, 'WordEndTime': 1234.780029,
{'WordName': '<sp>', 'WordID': 82551, 'WordStartTime': 1234.780029, 'WordEndTime': 1235.670044,

DEVICE AND METHOD FOR DETECTING DISPLAY OF PROVIDED CREDIT, AND PROGRAM

CROSS-REFERENCE TO RELATED APPLICATIONS

This application is a U.S. 371 Application of International Patent Application No. PCT/JP2019/021932, filed on 3 Jun. 2019, which application claims priority to and the benefit of JP Application No. 2018-108011, filed on 5 Jun. 2018, the disclosures of which are hereby incorporated herein by reference in their entireties.

TECHNICAL FIELD

The present invention relates to a sponsorship credit display detection device, a sponsorship credit display detection method, and a computer program that detect, in a broadcast program, a sponsorship credit display that displays a sponsor of that broadcast program.

BACKGROUND ART

A broadcast program that is broadcast by television broadcasting or the like may include a commercial (hereinafter referred to as a "CM" (Commercial Message)) and a sponsorship credit display that indicates a sponsor of the broadcast program. In recent years, in order to measure the effects of a CM or the like, there are demands to specify and count CMs in broadcast programs. Further, there are demands to distinguish whether a specified CM is a CM by a sponsor of the broadcast program (hereinafter referred to as a "time CM"), or a CM broadcast in a broadcast frame defined by a broadcasting station (hereinafter referred to as a "spot CM"). A time CM is a CM associated with a broadcast program, whereas a spot CM is a CM that is not associated with a broadcast program. Therefore, in order to distinguish between a time CM and a spot CM included in a broadcast program, it is useful to detect a sponsorship credit display that indicates a sponsor of the broadcast program.

Conventionally, a sponsorship credit display is visually confirmed by a worker, which leads to an increase in cost. To address this problem, it is conceivable to detect the sponsorship credit display using a device that detects a CM segment based on knowledge that the sponsorship credit display is likely to appear before or after the CM. For example, Patent Literature 1 describes a CM portion recognition device that determines a CM portion by utilizing the fact that in content, the volume of sound played between a broadcast program and a CM is lower than a predetermined value (for example, zero). Specifically, a time zone in which the volume is lower than a predetermined value for at least a predetermined time period (for example, 0.1 seconds) is determined to be a blank, and an interval between two blanks adjacent to each other is determined to be a CM portion.

PRIOR ART

Patent Literature

[PTL 1] Japanese Patent Application Publication No. 2000-322076

SUMMARY OF THE INVENTION

Technical Problem

However, according to the CM portion recognition device described in Patent Literature 1, because a blank has a width, it is difficult to accurately determine which time point of the width is the CM boundary, and therefore it is not possible to detect a CM segment with high precision.

The present invention was made in consideration of the above sort of problem, and it is an object of the present invention to provide a sponsorship credit display detection device, a sponsorship credit display detection method, and a computer program that enable detection of a sponsorship credit display in a broadcast program with higher precision by detecting a CM segment in the broadcast program with high precision.

Means for Solving the Problem

In order to solve the above problem, a sponsorship credit display detection device according to the present invention is a sponsorship credit display detection device that detects, in a broadcast program, a sponsorship credit display that displays a sponsor of that broadcast program, the sponsorship credit display detection device including: a CM segment detection unit that extracts cut points, which are time points where a frame in which the volume of the broadcast program is less than a volume threshold value and the amount of change from a previous frame is at least a pixel change threshold value is played, and detects a CM segment by comparing an interval between the extracted cut points with a CM defined length; a first sponsorship credit display segment estimation unit that estimates, as a first sponsorship credit display segment, a predetermined time period before or after at least one continuous CM segment detected by the CM segment detection unit; and an output unit that outputs information indicating the first sponsorship credit display segment.

Also, in order to solve the above problem, a sponsorship credit display detection method according to the present invention is a sponsorship credit display detection method in a sponsorship credit display detection device that detects, in a broadcast program, a sponsorship credit display that displays a sponsor of that broadcast program, the sponsorship credit display detection method including: a CM segment detection step of extracting cut points, which are time points where a frame in which the volume of an audio signal of the broadcast program is less than a volume threshold value and the amount of change from a previous frame is at least a pixel change threshold value is played, and detecting a CM segment by comparing an interval between the extracted cut points with a CM defined length; a sponsorship credit display segment estimation step of estimating, as a sponsorship credit display segment, a predetermined time period before or after at least one continuous CM segment detected in the CM segment detection step; and an output step of outputting information indicating the sponsorship credit display segment.

Also, in order to solve the above problem, a computer program according to the present invention causes a computer to function as the above sponsorship credit display detection device.

Effects of the Invention

According to the present invention, it is possible to detect a sponsorship credit display in a broadcast program with higher precision.

BRIEF DESCRIPTION OF DRAWINGS

FIG. 13 shows an example of results of voice recognition by a voice recognition unit in the sponsorship credit display detection device according to the second embodiment of the present invention.

DESCRIPTION OF EMBODIMENTS

Hereinafter, embodiments for carrying out the present invention will be described in detail with reference to the figures.

First Embodiment

Figure 1:
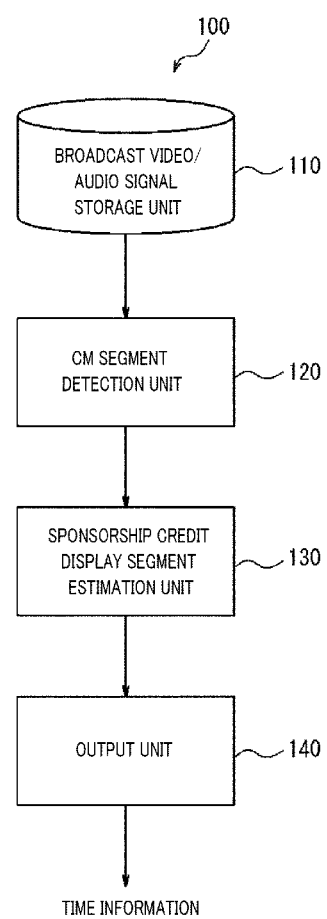
FIG. 1 shows an example configuration of a sponsorship credit display detection device according to a first embodiment of the present invention.

FIG. 1 shows an example configuration of a sponsorship credit display detection device according to a first embodiment of the present invention. The sponsorship credit display detection device 100 shown in FIG. 1 includes a broadcast video/audio signal storage unit 110, a CM segment detection unit 120, a sponsorship credit display segment estimation unit (a first sponsorship credit display segment estimation unit) 130, and an output unit 140. The sponsorship credit display detection device 100 detects, in a broadcast program, a sponsorship credit display that displays a sponsor of that broadcast program.

The broadcast video/audio signal storage unit 110 stores a broadcast video/audio signal obtained by encoding a broadcast program with a fixed time length (for example, 65 minutes). In the broadcast video/audio signal storage unit 110, for example, a signal obtained by encoding the video signal of a broadcast program according to the H.264 standard and a signal obtained by encoding the audio signal of the broadcast program according to the AAC (Advanced Audio Coding) standard are stored in the MP4 file format. It should be noted that the broadcast video/audio signal storage unit 110 is not limited to storing a video/audio signal of a broadcast program, and may also store a video/audio signal of a broadcast program for Internet distribution.

The CM segment detection unit 120 acquires the audio signal of the broadcast program that is the sponsorship credit display detection target from the broadcast video/audio signal storage unit 110, and compares the size (volume) of the audio signal of the broadcast program with a volume threshold value. Thus, at least one CM segment in the broadcast program is detected, and CM time information, which is the CM segment detection result, is output to the sponsorship credit display segment estimation unit 130.

When detecting the CM segment more accurately, the CM segment detection unit 120 detects cut points, which are time points where a frame in which the volume of the broadcast program is less than the volume threshold value and the amount of change from a previous frame is at least a pixel change threshold value is played, and detects at least one CM segment by comparing an interval between the cut points with a CM defined length. The CM defined length is the length of one CM, and is defined as 15 seconds, 30 seconds, 60 seconds, or the like. Details of the CM segment detection unit 120 will be described later.

The sponsorship credit display segment estimation unit 130 estimates, as a sponsorship credit display segment, a predetermined time period before or after at least one continuous CM segment detected by the CM segment detection unit 120. Specifically, CMs that are temporally continuous with respect to a CM segment are combined into one CM segment, and M seconds before the CM segment and N seconds after the CM segment are estimated as the sponsorship credit display segment. For example, M=N=10. Then, the sponsorship credit display segment estimation unit 130 generates a signal (in the present embodiment, a binary time-series signal) indicating the estimation results of the sponsorship credit display segment, and outputs the signal to the output unit 140.

The output unit 140 outputs information (in this embodiment, time information) indicating the sponsorship credit display segment estimated by the sponsorship credit display segment estimation unit 130. For example, when the sampling interval of the binary time-series signal is 1 second and a signal "1" is continuously arranged from the 300th to the 310th second, the time from 5 minutes 00 seconds to 5 minutes 10 seconds serves as the time information of the sponsorship credit display segment.

CM Segment Detection Unit

Figure 2:
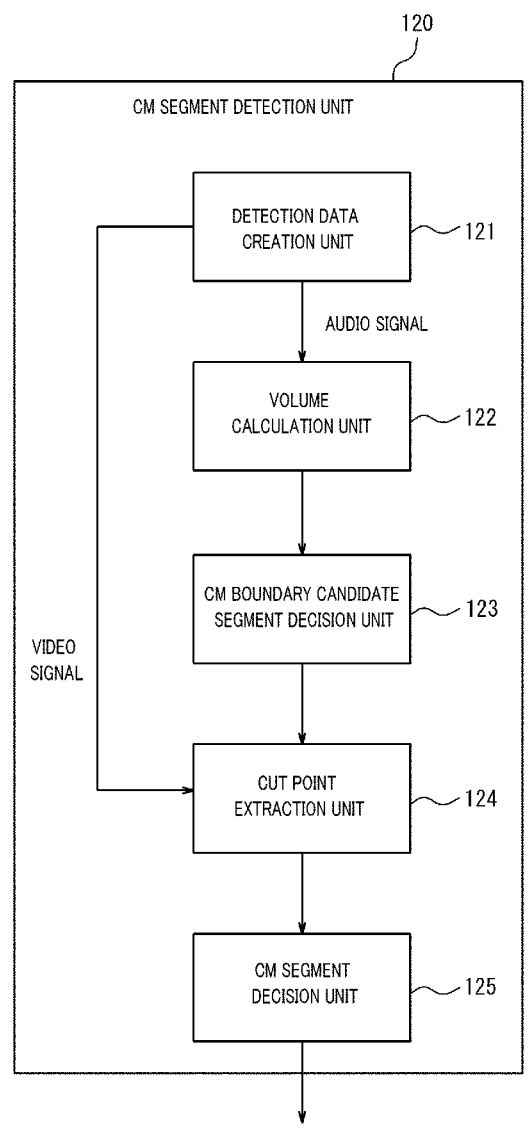
FIG. 2 shows an example configuration of a CM segment detection unit in the sponsorship credit display detection device according to the first embodiment of the present invention.

Next, details of the CM segment detection unit 120 will be described. FIG. 2 shows an example configuration of the CM segment detection unit 120. The CM segment detection unit 120 includes a detection data creation unit 121, a volume calculation unit 122, a CM boundary candidate segment decision unit 123, a cut point extraction unit 124, and a CM segment decision unit 125.

The detection data creation unit 121 decodes the audio signal acquired from the broadcast video/audio signal storage unit 110, creates a CM segment detection audio signal of a predetermined format (for example, WAV format, 16 kHz, 16 bits, monaural audio signal) and outputs the created signal to the volume calculation unit 122. Further, the detection data creation unit 121 decodes the video signal acquired from the broadcast video/audio signal storage unit 110, creates still images that are continuous in time series at predetermined time intervals, and outputs the created still images to the cut point extraction unit 124.

The volume calculation unit 122 calculates the volume in the time-series of the audio data, and outputs the calculation results to the CM boundary candidate segment decision unit 123.

The CM boundary candidate segment decision unit 123 detects a plurality of low volume segments in which the volume is less than the volume threshold value for at least a predetermined time (for example, 0.1 seconds) from the volume time-series data calculated by the volume calculation unit 122, and detects a portion where the interval between low volume segments is approximately a CM defined length (where the difference from the CM defined length is less than an error threshold value) as a CM. Then, the CM boundary candidate segment decision unit 123 decides a time zone including a low volume segment at the end of a detected CM as a CM boundary candidate segment. That is, when the difference between the interval between the low volume segments and the CM defined length is less than the error threshold value, a segment obtained by adding a predetermined time period before and after that low volume segment is decided as a CM boundary candidate segment. It should be noted that a CM boundary is a time point that becomes a break point between two continuous CMs, and a time point when that becomes a break point between the broadcast program and a CM.

Figure 3:
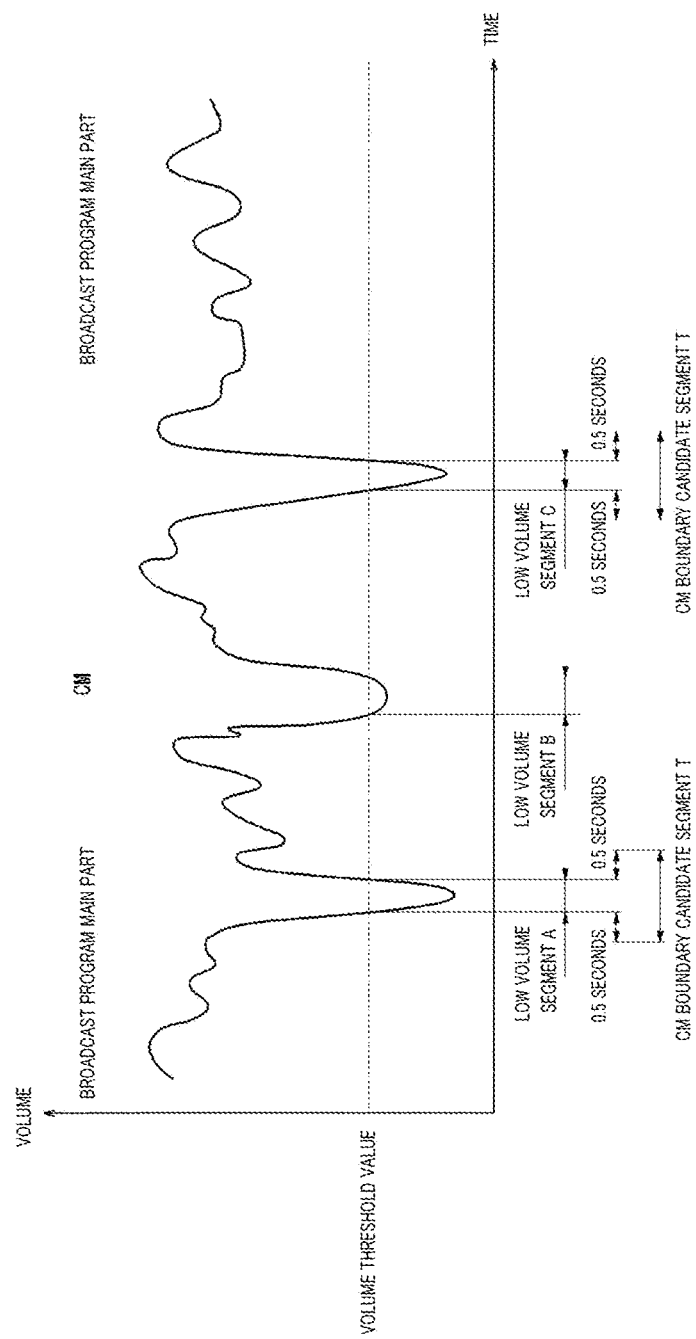
FIG. 3 is a schematic diagram showing an example of a CM boundary candidate segment in the sponsorship credit display detection device according to the first embodiment of the present invention.

FIG. 3 is a schematic diagram showing an example of a CM boundary candidate segment. When the time between a low volume segment A and a low volume segment C is approximately the CM defined length, the CM boundary candidate segment decision unit 123 detects a segment between the low volume segment A and the low volume segment C as a CM. Then, the CM boundary candidate segment decision unit 123 decides that a segment obtained by adding a predetermined time (0.5 seconds in the example of FIG. 3) before and after the low volume segment A, and a segment obtained by adding a predetermined time (0.5 seconds in the example of FIG. 3) before and after the low volume segment C, are respectively decided as CM boundary candidate segments T.

The cut point extraction unit 124 decodes the video signal acquired from the broadcast video/audio signal storage unit 110, and creates continuous frames in time-series. Then, from each CM boundary candidate segment $T_k$ (where k=1 to n (n being an integer of at least 2)) decided by the CM boundary candidate segment decision unit 123, in the CM boundary candidate segments, there are extracted a number C_k (an integer of at least 0) of time points (hereinafter referred to as "cut points") where a frame is played in which the amount of change from the previous frame is at least a pixel change threshold value. The amount of change is a value based on a difference or a ratio between the pixel values of each frame and the pixel values of the frame previous to that frame. For example, the amount of change may be a value based on the difference between the pixel value of each pixel that constitutes each frame and the pixel value of a pixel of the previous frame that corresponds to each pixel of each frame. The value based on the difference is, for example, the sum, the average value, or the median value of the absolute values of the differences for each pixel, or the mean square value of the differences. The amount of change may be a ratio of average values of pixels between adjacent frames. The playback time point, with the start time when the broadcast program is played from the beginning as a reference time point, is the elapsed time from the reference time point. The cut point extraction unit 124 extracts a playback time point of a frame whose change amount is at least the pixel change threshold value as a cut point. For example, as the cut point, the cut point extraction unit 124 may set the playback time point of the frame in which the ratio and the difference of the change amounts respectively are at least the pixel change threshold value. In experimentation, often about 6 to 8 cut points are extracted from each CM boundary candidate segment T.

Figure 4:
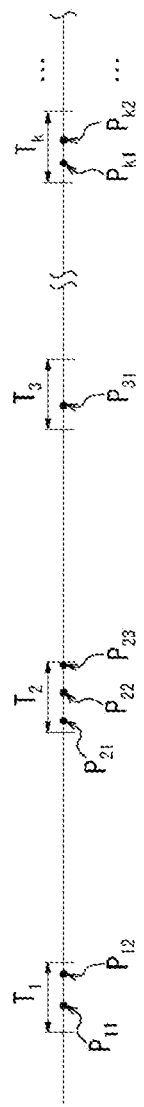
FIG. 4 shows an example of cut points in the sponsorship credit display detection device according to the first embodiment of the present invention.

FIG. 4 shows an example of cut points. In this example, the cut point extraction unit 124 extracts two cut points $P_{11}$ and $P_{12}$ from a CM boundary candidate segment $T_1$, extracts three cut points $P_{21}$, $P_{22}$, and $P_{23}$ from a CM boundary candidate segment $T_2$, extracts one cut point $P_{31}$ from a CM boundary candidate segment $T_3$, and extracts two cut points $P_{k1}$ and $P_{k2}$ from a CM boundary candidate segment $T_k$.

The CM segment decision unit 125 selects a cut point for each CM boundary candidate segment T so as to reduce the difference from the CM defined length, decides a segment between the selected cut points as a CM segment, and outputs information indicating the decided CM segment to the sponsorship credit display segment estimation unit 130.

Specifically, the CM segment decision unit 125 generates a plurality of cut point series $S_j$ including a combination of cut points selected one by one from each CM boundary candidate segment. The cut point series $S_j$ is a combination of cut points selected from each of a plurality of CM boundary candidate segments, and a total number $C_{all}$ of the cut point series $S_j$ is as shown in Equation (1). It should be noted that when no cut point is detected in the CM boundary candidate segment $T_k$, C_k=1.

$$C_{all}=C\_1 \times C\_2 \times \ldots \times C\_k \times \ldots \times C\_n \qquad (1)$$

Then, the CM segment decision unit 125 decides a cut point series in which there is the smallest sum of the differences between adjacent cut point times, which are the times between the cut points selected one by one in the adjacent CM boundary candidate segments, and decides a segment between the cut points of that cut point series as a CM segment. An adjacent cut point time is a time between one cut point in the CM boundary candidate segment $T_k$ and one cut point in the CM boundary candidate segment $T_{k-1}$.

For example, the CM segment decision unit 125 calculates the difference between each adjacent cut point time and the CM defined length. The CM segment decision unit 125, in consideration of the influence of noise, calculates a number (hereinafter, referred to as the "coincidence number") such that the difference is less than a time difference threshold value for each cut point series $S_j$. The time difference threshold value is, for example, the time in which a predetermined number of frames of the broadcast video is played. When the predetermined number of frames is 2 and the frame rate of the broadcast video is 30 fps, the time difference threshold value is (2/30) seconds.

Processing of the CM segment decision unit 125 will be described with reference to FIG. 5. Here, the CM boundary candidate segment decision unit 123 decides the three CM boundary candidate segments $T_1$ to $T_3$, and the cut point extraction unit 124 extracts the two CM cut points $P_{11}$ and $P_{12}$ from the CM boundary candidate segment $T_1$, extracts the three cut points $P_{21}$, $P_{22}$, and $P_{23}$ from the CM boundary candidate segment $T_2$, and extracts the one cut point $P_{31}$ from the CM boundary candidate segment $T_3$.

Figure 5:
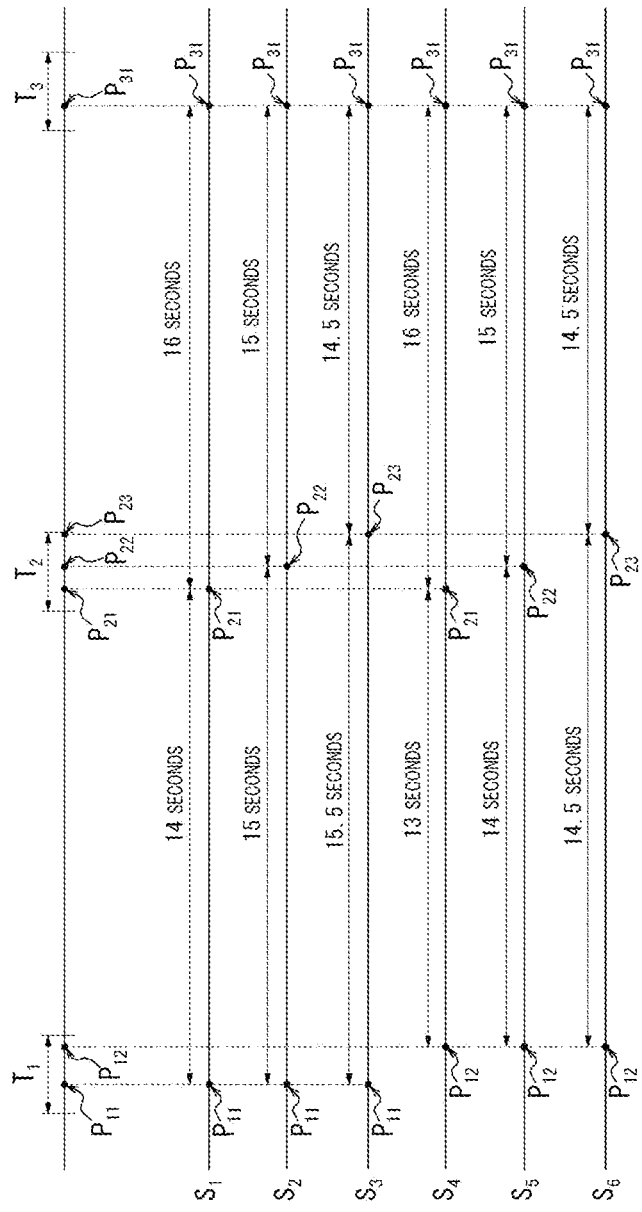
FIG. 5 illustrates processing of a CM segment decision unit in the sponsorship credit display detection device according to the first embodiment of the present invention.

In the example shown in FIG. 5, the total number $C_{all}$ of the cut point series $S_j$ is $C\_1 \times C\_2 \times C\_3 = 2 \times 3 \times 1 = 6$. A cut point series $S_1$ is a series including a combination of the cut points $P_{11}$, $P_{21}$, and $P_{31}$, and a cut point series $S_2$ is a combination of the cut points $P_{11}$, $P_{22}$, and $P_{31}$. A cut point series $S_3$ is a series including a combination of the cut points $P_{11}$, $P_{23}$, and $P_{31}$, and a cut point series $S_4$ is a combination of the cut points $P_{12}$, $P_{21}$, and $P_{31}$. A cut point series $S_5$ is a series including a combination of the cut points $P_{12}$, $P_{22}$, and $P_{31}$, and a cut point series $S_6$ is a series including a combination of the cut points $P_{12}$, $P_{23}$, and $P_{31}$.

The CM segment decision unit 125 calculates the difference between each adjacent cut point time and the CM defined length in each of the cut point series $S_j$ (where j=1 to 6). Assuming that the CM defined length is 15 seconds and the predetermined range is (2/30) seconds, the CM segment decision unit 125 calculates the coincidence numbers of the cut point series $S_1$ to $S_6$ respectively as 0, 2, 0, 0, 1, and 0.

When there is one cut point series $S_j$ that maximizes the coincidence number, the CM segment decision unit 125 determines that the cut point series $S_j$ is the boundary series, and when there are a plurality of cut point series $S_j$ that maximize the coincidence number, the CM segment decision unit 125 determines that the cut point series $S_j$ having the smallest total of the differences between each adjacent cut point time and the CM defined length among the plurality of cut point series $S_j$ that maximize the coincidence number is the boundary series. In the example shown in FIG. 5, the CM segment decision unit 125 determines that among the cut point series $S_1$ to $S_6$, the cut point series that maximizes the coincidence number is the one cut point series $S_2$, so the cut point series $S_2$ is determined as the boundary series. Also, when a cut point whose adjacent cut point time approximately matches the CM defined length is included in the boundary series, the CM segment decision unit 125 can regard that cut point to be a CM boundary. Therefore, the CM segment decision unit 125 decides that a CM segment between cut points whose adjacent cut point time approximately matches the CM defined length is a CM segment.

Also, the CM segment decision unit 125 decides a CM boundary of a CM boundary candidate segment that does not include a cut point whose adjacent cut point time approximately matches the CM defined length in the boundary series (hereinafter, referred to as an "effective cut point") based on the CM boundary decided in the adjacent CM boundary candidate segments and the CM defined length. A specific example of this case will be described with reference to FIGS. 6 and 7.

Figure 6:
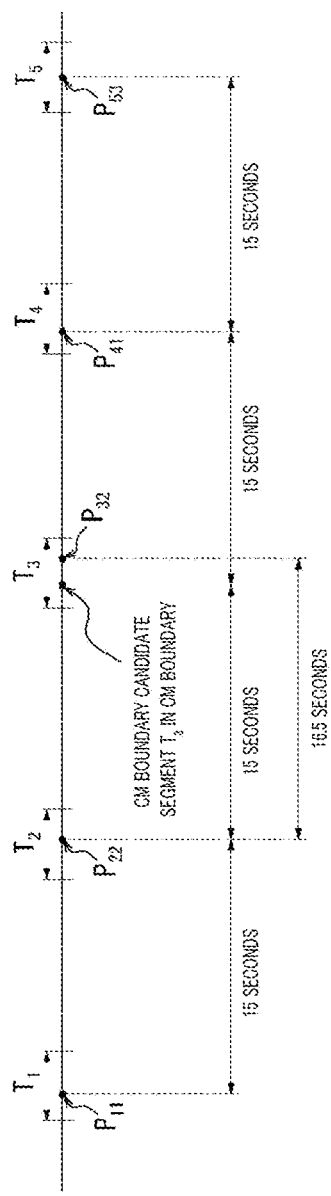
FIG. 6 shows a first decision example of a CM boundary in the sponsorship credit display detection device according to the first embodiment of the present invention.

FIG. 6 shows a first example decision of a CM boundary of a CM boundary candidate segment that does not include an effective cut point. In the first example decision, the CM segment decision unit 125 decides a time point where the time from the CM boundary in the adjacent CM boundary candidate segment becomes approximately the CM defined length as the CM boundary. In the example shown in FIG. 6, the boundary series is a cut point series including cut points $P_{11}$, $P_{22}$, $P_{32}$, $P_{41}$, and $P_{53}$. In this boundary series, it is assumed that the CM segment decision unit 125 determines that the adjacent cut point time for the cut point $P_{22}$ matches the CM defined length of 15 seconds, and because the adjacent cut point time for the cut point $P_{32}$ is 16.5 seconds, the difference between the adjacent cut point time and the CM defined length is at least the time difference threshold value, and therefore the CM boundary candidate segment $T_3$ is determined to be a CM boundary candidate segment that does not include an effective cut point.

In this case, the CM segment decision unit 125 decides the cut point $P_{22}$ as the CM boundary in the CM boundary candidate segment $T_2$. In addition, as the CM boundary in the CM boundary candidate segment $T_3$ that does not include an effective cut point, the CM segment decision unit 125 decides a time point obtained by, with respect to the cut point $P_{22}$, adding or subtracting an allowable time to/from the CM defined length. The allowable time is a different time for each CM boundary candidate segment. The allowable time of each CM boundary candidate segment is adjusted such that the total time of adding or subtracting the allowable time to the CM defined length becomes the playback time of the entire CM.

FIGS. 7(a) and 7(b) show a second example decision of a CM boundary in a CM boundary candidate segment that does not include an effective cut point. In the second example decision, when a cut point has not been extracted in the CM boundary candidate segment $T_k$ by the cut point extraction unit 124, the CM segment decision unit 125 decides a time point where the time from the CM boundary in the adjacent CM boundary candidate segment becomes approximately the CM defined length as the CM boundary. For example, when video near the CM boundary is blacked out, a cut point might not be extracted in the CM boundary candidate segment.

Figure 7:
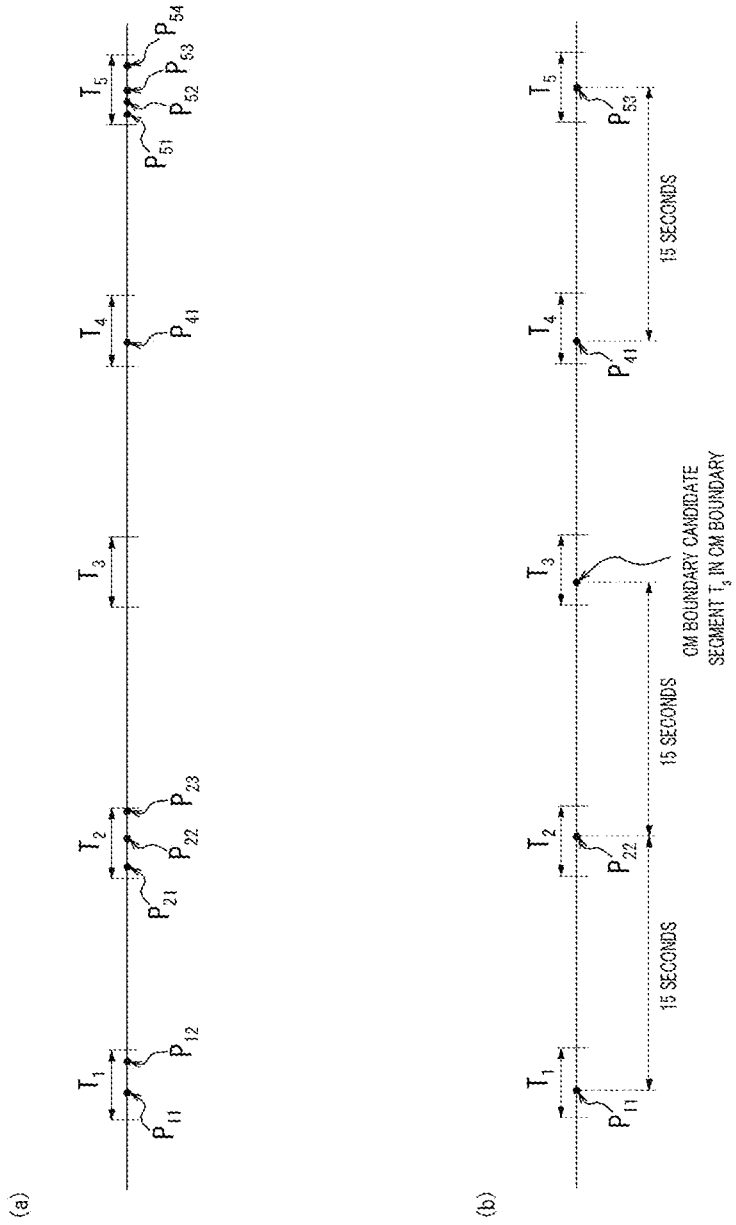
FIGS. 7 (a) and 7 (b) show a second decision example of a CM boundary in the sponsorship credit display detection device according to the first embodiment of the present invention.

In the example shown in FIG. 7 (a), the boundary series is a cut point series including the cut points $P_{11}$, $P_{22}$, $P_{41}$, and $P_{53}$, and the CM boundary candidate segment $T_3$ has no cut points. In this case, as shown in FIG. 7(b), as the CM boundary in the CM boundary candidate segment $T_3$, the CM segment decision unit 125 decides a time point obtained by, with respect to the CM boundary extracted in the CM boundary candidate segment $T_2$ prior to the CM boundary candidate segment $T_3$ (the cut point $P_{22}$), adding or subtracting the allowable time to/from the CM defined length. As a result, the CM boundary can be accurately detected even when the amount of change of the video is small in the CM boundary candidate segment and a cut point has not been extracted.

It should be noted that the CM segment decision unit 125 may perform the above processing after dividing the broadcast program such that the time needed to decide the CM segment is no more than the allowable time. For example, the CM segment decision unit 125 calculates the total number $C_{all}$ of the cut point series $S_j$ included in each divided broadcast program, and when the total number $C_{all}$ is a threshold value or less, the broadcast program is not divided, and when the total number $C_{all}$ is exceeds the threshold value, the broadcast program is divided such that the total number $C_{all}$ of a cut point series $S_n$ of the divided broadcast programs becomes a threshold value or less. At this time, the CM segment decision unit 125 divides the broadcast program at cut point positions. As a result, it is possible to prevent the broadcast program from being divided at the time point when it is estimated to be in the midst of a CM between cut points. Further, the CM segment decision unit 125 may equally divide the broadcast program such that the difference in lengths of the divided broadcast program falls within a predetermined range, or may divide the broadcast program such that the total number $C_{all}$ of the cut point series $S_j$ in the divided broadcast program $C_{all}$ becomes a defined value.

Figure 8:
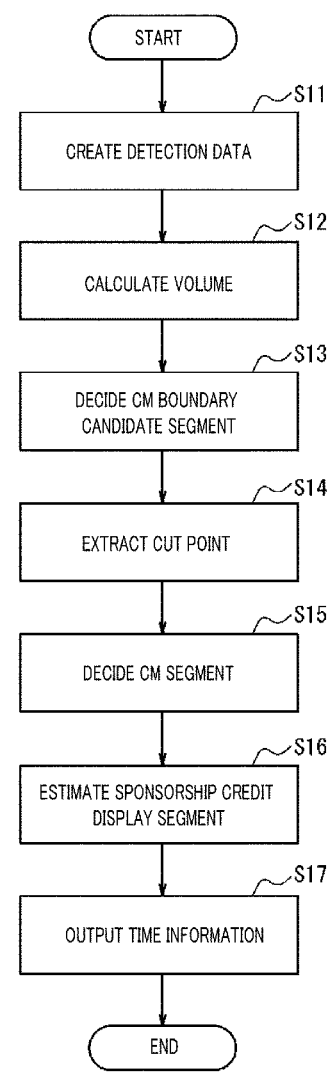
FIG. 8 is a flowchart showing an example of a sponsorship credit display detection method according to the first embodiment of the present invention.

Sponsorship Credit Display Detection Method Next, a sponsorship credit display detection method according to the sponsorship credit display detection device 100 will be described with reference to FIG. 8. FIG. 8 is a flowchart showing an example of a sponsorship credit display detection method according to the first embodiment of the present invention.

In step S11, the detection data creation unit 121 creates voice data for CM segment detection.

In step S12, the volume calculation unit 122 calculates volume in a time-series of the voice data created in step S11.

In step S13, the CM boundary candidate segment decision unit 123 extracts low volume segments in which the volume calculated in step S12 is less than a volume threshold value. Then, a portion where the interval between low volume segments adjacent to each other is approximately the CM defined length is detected as a CM. Then, a time zone including a low volume segment at an end of the detected CM is determined as a CM boundary candidate segment.

In step S14, the cut point extraction unit 124 extracts cut points from video of the CM boundary candidate segment decided in step S13.

In step S15, the CM segment decision unit 125, with respect to all the cut point series $S_j$ constituted by a combination of the cut points in each CM boundary candidate segment extracted in step S14, calculates a coincidence number such that the difference between each adjacent cut point time and the CM defined length is less than a time difference threshold value. When there is one cut point series $S_j$ with the maximum coincidence number, the cut point series $S_j$ is determined to be the boundary series, and when there are a plurality of cut point series $S_j$ with the maximum coincidence number, among the cut point series $S_j$ with the maximum coincidence number, the cut point series $S_j$ having the smallest difference between the adjacent cut point time and the CM defined length is determined to be the boundary series. Then, the CM segment decision unit 126 decides a cut point whose adjacent cut point time approximately matches the CM defined length in the boundary series as a CM boundary, and decides a segment between adjacent CM boundaries as a CM segment.

In step S16, the sponsorship credit display segment estimation unit 130 combines the CM segments detected in step S15 with a CM that is continuous in time into one CM segment, and estimates a predetermined time before and after that CM segment as the sponsorship credit display segment.

In step S17, the output unit 140 outputs the time information of the sponsorship credit display segment estimated in step S16.

As described above, in the first embodiment of the present invention, cut points, which are time points where a frame in which the volume of the broadcast program is less than a volume threshold value and the amount of change from a previous frame is at least a pixel change threshold value is played, are extracted, and a CM segment is detected by comparing an interval between the extracted cut points with a CM defined length. Video switching often occurs between CMs, and between a CM and a broadcast program. That is, the CM boundary is often a cut point. Therefore, according to the first embodiment of the present invention, compared to a case of detecting the CM boundary based only on the volume, by setting a CM segment boundary based on a cut point in a candidate segment that includes a low volume segment, it is possible to precisely detect a CM segment. Therefore, according to the first embodiment of the present invention, it is possible to detect a sponsorship credit display in a broadcast program with higher precision.

In verification experiments by the inventors, when the CM segment detection unit 120 detected CM boundaries of a broadcast program including 742 CMs and having a playback time of 17 hours, the total difference from the actual CM boundaries was 3.7 seconds. On the other hand, when CM boundaries were detected based only on low volume segments as with conventional technology, the total difference from the actual CM boundaries was 17.7 seconds. Further, in these verification experiments, the precision rate in the conventional determination was 93.5%, whereas the precision rate in the determination by the CM segment detection unit 120 was 93.9%. Further, the recall rate in the conventional determination was 97.3%, whereas the recall rate in the determination by the CM segment detection unit 120 was 99.0%. From these results, it was verified that the CM segment detection unit 120 can determine CM boundaries more accurately than the conventional technology.

Second Embodiment

Figure 9:
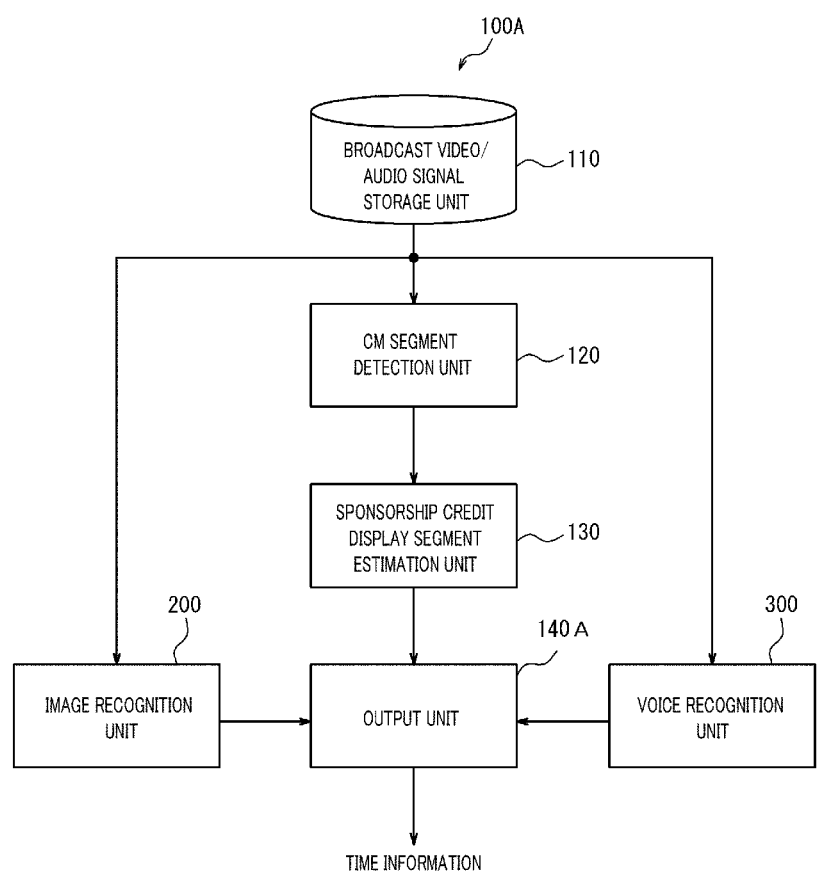
FIG. 9 shows an example configuration of a sponsorship credit display detection device according to a second embodiment of the present invention.

Next, a second embodiment of the present invention will be described. FIG. 9 shows an example configuration of a sponsorship credit display detection device 100A according to the second embodiment of the present invention. In FIG. 9, the same configurations as those in FIG. 1 are designated by the same reference signs, and a description thereof will be omitted here.

The sponsorship credit display detection device 100A shown in FIG. 9 differs from the sponsorship credit display detection device 100 shown in FIG. 1 in that an image recognition unit 200 and a voice recognition unit 300 are added, and the output unit 140 is changed to an output unit 140A. That is, the sponsorship credit display detection device 100A according to the present embodiment includes a broadcast video/audio signal storage unit 110, a CM segment detection unit 120, a sponsorship credit display segment estimation unit 130, the output unit 140A, the image recognition unit 200, and the voice recognition unit 300. It should be noted that the sponsorship credit display detection device 100A may be configured to include only one of the image recognition unit 200 and the voice recognition unit 300.

The image recognition unit 200 estimates a second sponsorship credit display segment using a detection model based on the video signal of a broadcast program acquired from the broadcast video/audio signal storage unit 110, and outputs a signal indicating estimation results (in the present embodiment, a binary time-series signal) to the output unit 140A. Parameters applied to the detection model are learned in advance using, in a learning broadcast program in which the sponsorship credit display has been detected, learning data including a still image in which the sponsorship credit display is displayed and a still image in which the sponsorship credit display is not displayed. Details of the image recognition unit 200 will be described later.

The voice recognition unit 300 estimates the sponsorship credit display segment based on the audio signal of a broadcast program acquired from the broadcast video/audio signal storage unit 110, and outputs a signal indicating estimation results (in the present embodiment, a binary time-series signal) to the output unit 140A. The voice recognition unit 300, from results of voice recognition of the audio signal of the broadcast program, detects a related phrase related to the sponsorship credit display included in an announcement of the sponsorship credit display, and using an appearance time of the related phrase as a start point, estimates a predetermined period as a third sponsorship credit display segment. Details of the voice recognition unit 300 will be described later.

When the sponsorship credit display detection device 100A includes only the image recognition unit 200 among the image recognition unit 200 and the voice recognition unit 300, the output unit 140A outputs the first sponsorship credit display segment estimated by the sponsorship credit display segment estimation unit 130, and as a final sponsorship credit display segment, information (in this embodiment, time information) that indicates a common portion or a union of the second sponsorship credit display segment estimated by the image recognition unit 200.

When the sponsorship credit display detection device 100A includes only the voice recognition unit 300 among the image recognition unit 200 and the voice recognition unit 300, the output unit 140A outputs the first sponsorship credit estimated by the sponsorship credit display segment estimation unit 130, and as a final sponsorship credit display segment, information (in this embodiment, time information) that indicates a common portion or a union of the third sponsorship credit display segment estimated by the voice recognition unit 300.

When the sponsorship credit display detection device 100A includes both the image recognition unit 200 and the voice recognition unit 300, the output unit 140A outputs the first sponsorship credit display segment estimated by the sponsorship credit display segment estimation unit 130, the second sponsorship credit display segment estimated by the image recognition unit 200, and, as a final sponsorship credit display segment, information (in this embodiment, time information) that indicates a common portion or a union of the third sponsorship credit display segment estimated by the voice recognition unit 300.

The output unit 140A may output, as the final sponsorship credit display segment, a segment that continues for at least a predetermined time period among the above union or common portion. Here, the predetermined time period is approximately the same time period as the time period generally set as the sponsorship credit display segment (for example, about several tens of seconds). It should be noted that in the present embodiment, since the first sponsorship credit display segment, the second sponsorship credit display segment, and the third sponsorship credit display segment are binary time-series signals, a union is calculated by a logical sum operation, and a common portion is calculated by a logical product operation.

Image Recognition Unit

Figure 10:
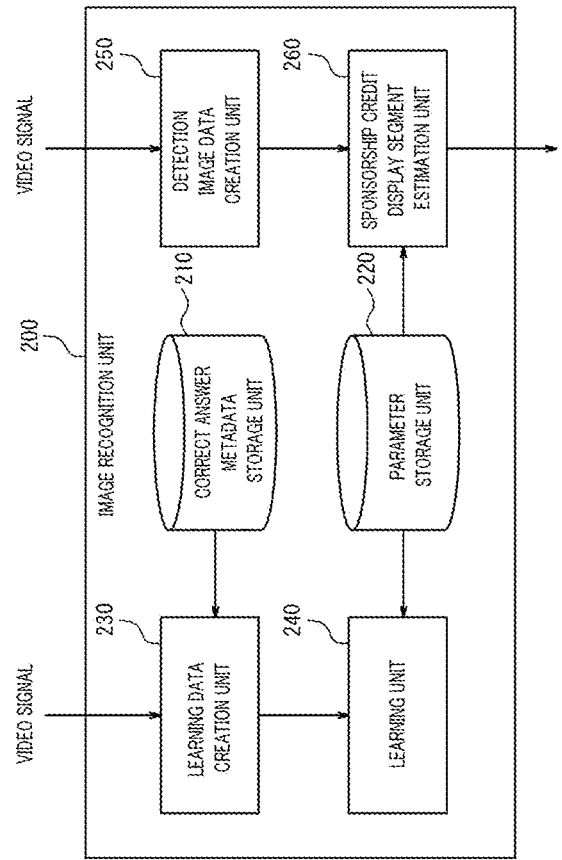
FIG. 10 shows an example configuration of an image recognition unit in the sponsorship credit display detection device according to the second embodiment of the present invention.

Next, details of the image recognition unit 200 will be described. FIG. 10 shows an example configuration of the image recognition unit 200. The image recognition unit 200 shown in FIG. 10 includes a correct answer metadata storage unit 210, a parameter storage unit 220, a learning data creation unit 230, a learning unit 240, a detection image data creation unit 250, and a sponsorship credit display segment estimation unit 260.

The correct answer metadata storage unit 210 stores time information indicating the time when the sponsorship credit display was displayed in the broadcast program. The time at which the sponsorship credit display was displayed is, for example, visually confirmed in advance by a worker and stored in the correct answer metadata storage unit 210.

The parameter storage unit 220 stores parameters to be applied to a detection model for detecting the sponsorship credit display in the broadcast program, described later.

The detection model is, for example, a model using a convolutional neural network. Although a detailed description is omitted, a convolutional neural network generally has a configuration in which a convolution layer and a pooling layer are repeatedly arranged in this order from an input side a plurality of times, and then a fully connected layer is arranged. In the convolution layer, processing that applies a convolution filter to an input image is performed. In the pooling layer, processing is performed in which a rectangular filter is applied to the output of the convolution layer while sequentially shifting the filter, and the maximum value in the rectangular filter is extracted to generate a new image. In the fully-combined layer, processing is performed in which image data from which characteristic portions have been extracted by the convolution layer and the pooling layer is combined into one node, and a value converted by an activation function is output. For example, when the detection model is a model using a convolutional neural network, the parameter storage unit 220 stores a filter weight of the filter applied in each layer, a bias parameter added to the output of the convolution layer, and the like. It should be noted that the detection model is not limited to a model constructed using a convolutional neural network, and may be constructed using, for example, an SVM (Support Vector Machine) or the like.

The learning data creation unit 230 acquires, from the broadcast video/audio signal storage unit 110, the video signal of a learning broadcast program for which a sponsorship credit display has been detected. In addition, the learning data creation unit 230 acquires the time information of the sponsorship credit display in that broadcast program from the correct answer metadata storage unit 210. As learning data, from the learning broadcast program for which the sponsorship credit display has been detected, the learning data creation unit 230 creates a still image in which the sponsorship credit display is displayed (hereinafter referred to as a "still image with the sponsorship credit display") and a still image in which the sponsorship credit display is not displayed (hereinafter referred to as a "still image without the sponsorship credit display").

Specifically, the learning data creation unit 230 decodes the acquired video signal and creates still images that are continuous in time-series at predetermined time intervals. It should be noted that the still images may be created using only an I frame that has been intra-coded between screens. For example, the learning data creation unit 230 creates a still image every one second. In this case, the learning data creation unit 230 creates, for example, 3900 still images that are continuous in time-series at 1-second intervals for a 65-minute broadcast program.

Next, the learning data creation unit 230 extracts still images with the sponsorship credit display from the generated still images based on the acquired time information. Further, the learning data creation unit 230 extracts still images without the sponsorship credit display from the generated still images. Still images without the sponsorship credit display are randomly extracted from the still images at times other than the time indicated by the acquired time information. The learning data creation unit 230 extracts, for example, about 8000 still images with the sponsorship credit display and about 8000 still images without the sponsorship credit display. The learning data creation unit 230 outputs the extracted still images with the sponsorship credit display and the extracted still images without the sponsorship credit display to the learning unit 240 as learning data.

The learning unit 240 learns parameters to be applied to the detection model for detecting the sponsorship credit display in the broadcast program using the learning data created by the learning data creation unit 230 (the still images with the sponsorship credit display and the still images without the sponsorship credit display). For example, when the detection model is a model using the above convolutional neural network, the learning unit 240 learns the filter weight and the bias parameters by using a probabilistic gradient method. The learning unit 240 stores the learned parameters in the parameter storage unit 220.

The detection image data creation unit 250 acquires the video signal of the broadcast program that is the sponsorship credit display detection target from the broadcast video/audio signal storage unit 110. The detection image data creation unit 250 decodes the video signal of the acquired broadcast program, and creates still images that are continuous in time-series at predetermined time intervals. For example, the detection image data creation unit 250 creates a still image every one second. In this case, the detection image data creation unit 250 creates, for example, 3900 still images that are continuous in time-series at 1-second intervals for a 65-minute broadcast program. The detection image data creation unit 250 outputs the created still images that are continuous in time-series to the sponsorship credit display segment estimation unit 260.

The sponsorship credit display segment estimation unit 260 estimates the sponsorship credit display segment in the broadcast program that is the sponsorship credit display detection target using the detection model to which the parameters learned by the learning unit 240 have been applied.

Specifically, the sponsorship credit display segment estimation unit 260 sequentially inputs, to the detection model for detecting the sponsorship credit display in the broadcast program, the detection image data (still images of the broadcast program that is the sponsorship credit display detection target) that has been output from the detection image data creation unit 250. Then, the sponsorship credit display segment estimation unit 260 generates a time-series signal indicating the presence or absence of the sponsorship credit display in each still image based on an output value of the detection model for each still image. Here, the sponsorship credit display segment estimation unit 260 applies the parameters stored in the parameter storage unit 220 to the detection model. For example, when the detection model is a model using a convolutional neural network, the sponsorship credit display segment estimation unit 260 constructs a network (a detection model) in which the parameters stored in the parameter storage unit 220 are fixed values.

If the output value of the detection model is at least a predetermined threshold value, the sponsorship credit display segment estimation unit 260 determines that the input still image is a still image with the sponsorship credit display. When the output value of the detection model is less than the predetermined threshold value, the sponsorship credit display segment estimation unit 260 determines that the input still image is a still image without the sponsorship credit display. The sponsorship credit display segment estimation unit 260 performs the above-described determination for each still image continuous in time-series of the broadcast program that is the sponsorship credit display detection target, and generates a signal indicating the determination result (in the present embodiment, a binary time-series signal). The sponsorship credit display segment estimation unit 260 outputs a signal that is a signal "1" for a segment estimated to be a sponsorship credit display segment and outputs a signal that is a signal "0" for other segments to the output unit 140A.

Generally, in the sponsorship credit display, white characters, colored characters, and the like surrounded with a black frame are used as the characters indicating a sponsor name. Further, in the sponsorship credit display, characters of various fonts are used as the characters indicating the sponsor name. Further, even in the sponsorship credit display, there are cases where the characters "sponsor" are included and cases where the characters "sponsor" are not included. Further, the sponsorship credit display may include only a sponsor logo. Further, the position of the sponsorship credit display may be the entire screen, lower right, lower left, upper right, upper left, or lower center. As described above, the sponsorship credit display has various variations. It is difficult to detect such various variations of the sponsorship credit display using, for example, a feature vector of an object appearing in an image.

In consideration of this fact, in the image recognition unit 200, learning data is created from a broadcast program for which the sponsorship credit display has been detected, and the learning data is used to learn the parameters to be applied to the detection model for detecting the sponsorship credit display in the broadcast program. Also, the image recognition unit 200 estimates the sponsorship credit display segment in the broadcast program that is the sponsorship credit display detection target using the detection model to which the learned parameters have been applied. Therefore, according to the image recognition unit 200, by using sponsorship credit displays of various variations as the learning data, it is possible to detect the sponsorship credit display segment even for a sponsorship credit display with various variations as described above. Also, according to the image recognition unit 200, because the video signal of the broadcast program that is the sponsorship credit display detection target is used, the sponsorship credit display segment can be detected even when there is no announcement.

Modified Example of Image Recognition Unit

Figure 11:
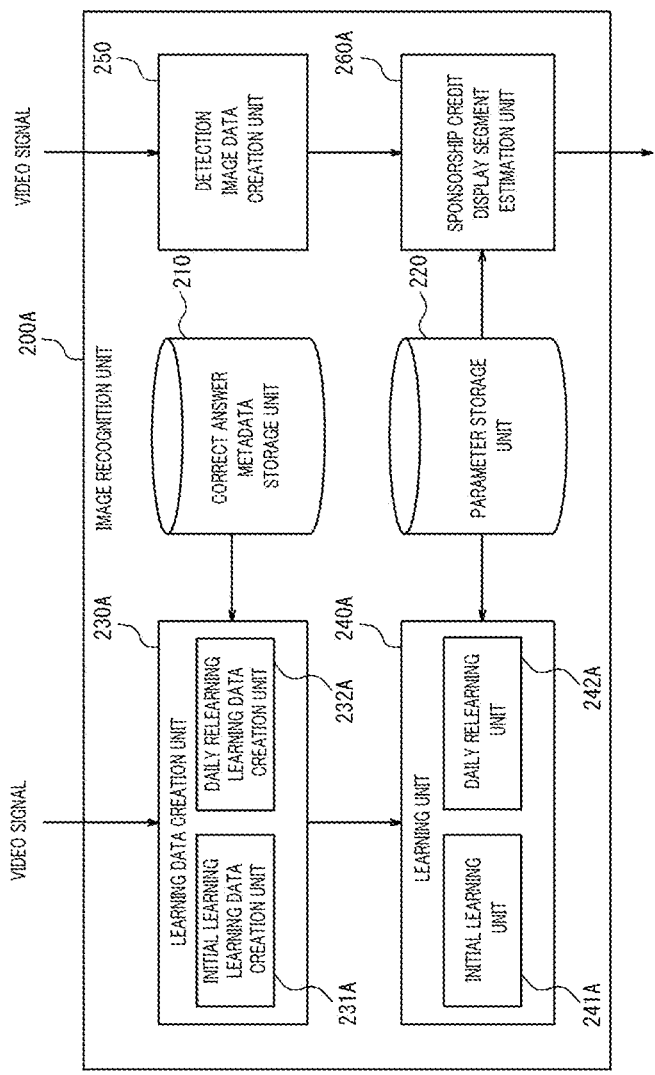
FIG. 11 shows another example configuration of an image recognition unit in the sponsorship credit display detection device according to the second embodiment of the present invention.

Next, a modified example of the image recognition unit will be described. FIG. 11 illustrates another example configuration of the image recognition unit. In FIG. 11, the same configurations as those in FIG. 10 are designated by the same reference signs, and a description thereof will be omitted here. The image recognition unit 200A shown in FIG. 11 differs from the image recognition unit 200 shown in FIG. 10 in that the learning data creation unit 230 is changed to a learning data creation unit 230A, the learning unit 240 is changed to a learning unit 240A, and the sponsorship credit display segment estimation unit 260 is changed to a sponsorship credit display segment estimation unit 260A.

The learning data creation unit 230A acquires, for each day of the week, the video signal of a broadcast program for which a sponsorship credit display has been detected from the broadcast video/audio signal storage unit 110. Further, the learning data creation unit 230A acquires the time information of the sponsorship credit display in that broadcast program from the correct answer metadata storage unit 210. The learning data creation unit 230A creates learning data for each day of the week from the broadcast program of each day of the week on which the acquired sponsorship credit display has been detected, and outputs the learning data to the learning unit 240A. The learning data creation unit 230A includes an initial learning learning data creation unit 231A, and a daily relearning learning data creation unit 232A.

The initial learning learning data creation unit 231A acquires the video signal of a broadcast program for which the sponsorship credit display has been detected from the broadcast video/audio signal storage unit 110. For example, the initial learning learning data creation unit 231A acquires the video signal of a broadcast program for one day one month ago. Further, the initial learning learning data creation unit 231A acquires the time information of the sponsorship credit display in the broadcast program for which the video signal was acquired from the correct answer metadata storage unit 210. Then, the initial learning learning data creation unit 231A creates learning data for initial learning of the detection model from the acquired broadcast program in which the sponsorship credit display was detected, based on the time information of the sponsorship credit display in that broadcast program.

Specifically, the initial learning learning data creation unit 231A decodes the acquired video signal and creates still images that are continuous in time-series at predetermined time intervals (for example, every one second).

Next, the initial learning learning data creation unit 231A extracts still images with the sponsorship credit display from the generated still images based on the acquired time information. Also, the initial learning learning data creation unit 231A extracts still images without the sponsorship credit display from the generated still images. The still images without the sponsorship credit display are randomly extracted from the still images at times other than the time indicated by the acquired time information. The initial learning learning data creation unit 231A extracts, for example, about 8000 still images with the sponsorship credit display and about 8000 still images without the sponsorship credit display. The initial learning learning data creation unit 231A outputs the extracted still images with the sponsorship credit display and the extracted still images without the sponsorship credit display to the learning unit 240A as learning data for initial learning of the detection model.

The daily relearning learning data creation unit 232A acquires, for each day of the week, the video signal of a broadcast program for which the sponsorship credit display has been detected from the broadcast video/audio signal storage unit 110. For example, the daily relearning learning data creation unit 232A acquires the video signal of broadcast programs for each day one week ago. Further, the daily relearning learning data creation unit 232A acquires the time information of the sponsorship credit display in the broadcast programs for which the video signal was acquired from the correct answer metadata storage unit 210. Then, the daily relearning learning data creation unit 232A creates learning data for relearning of the detection model from the broadcast program in which the sponsorship credit display was detected, for each day of the week, based on the time information of the sponsorship credit display in that broadcast program.

Specifically, the daily relearning learning data creation unit 232A decodes the acquired broadcast video/audio signal and creates still images that are continuous in time-series at predetermined time intervals (for example, every one second).

Next, the daily relearning learning data creation unit 232A extracts still images with the sponsorship credit display and still images without the sponsorship credit display from the generated still images based on the acquired time information. The still images without the sponsorship credit display are randomly extracted from the still images at times other than the time indicated by the acquired time information. The daily relearning learning data creation unit 232A extracts, for example, about 1000 still images with the sponsorship credit display and about 1000 still images without the sponsorship credit display. The learning data creation unit 232A performs the above processing for each day of the week. Then, the daily relearning learning data creation unit 232A outputs the extracted still images with the sponsorship credit display and the extracted still images without the sponsorship credit display that were extracted for each day of the week to the learning unit 240A as relearning data for each day of the week.

The learning unit 240A uses the learning data for each day of the week created by the learning data creation unit 230A to learn (relearn) the parameters to be applied to the detection model for each day of the week. The learning unit 240A includes an initial learning unit 241A and a daily relearning unit 242A.

The initial learning unit 241A learns parameters to be applied to the detection model for detecting the sponsorship credit display in the broadcast program using the learning data for initial learning created by the initial learning learning data creation unit 231A. For example, when the detection model is a model using the above convolutional neural network, the initial learning unit 241A learns the filter weight and the bias parameters by using a probabilistic gradient method. The initial learning unit 241A stores the learned parameters in the parameter storage unit 220.

The daily relearning unit 242A uses the relearning data for each day of the week created by the daily relearning learning data creation unit 232A to learn the parameters to be applied to the detection model for detecting the sponsorship credit display in the broadcast program for each day of the week. The daily relearning unit 242A stores the learned parameters in the parameter storage unit 220. That is, the daily relearning unit 242A learns the parameters applied to the detection model for each day of the week, and stores the parameters in the parameter storage unit 220. By learning (relearning) the parameters applied to the detection model using the relearning data for each day of the week, it is possible to set parameters suitable for detecting the sponsorship credit display in the broadcast program for each day of the week.

The sponsorship credit display segment estimation unit 260A applies the parameters stored in the parameter storage unit 220, learned for the day of the week on which the broadcast program that is the sponsorship credit display detection target is to be broadcast, to the detection model, and estimates a sponsorship credit display segment in the broadcast program.

Specifically, the sponsorship credit display segment estimation unit 260A sequentially inputs, to the detection model for detecting the sponsorship credit display in the broadcast program, the still images that are continuous in a time-series of the broadcast program that is the sponsorship credit display detection target that have been output from the detection image data creation unit 250. Then, the sponsorship credit display segment estimation unit 260A generates a time-series signal indicating the presence or absence of the sponsorship credit display in each still image based on an output value of the detection model for each still image. Here, the sponsorship credit display segment estimation unit 260A applies the parameters stored in the parameter storage unit 220, learned for the day of the week on which the broadcast program that is the sponsorship credit display detection target is to be broadcast, to the detection model.

For example, when the detection model is a model using a convolutional neural network, the sponsorship credit display segment estimation unit 260A constructs a network (a detection model) in which the parameters stored in the parameter storage unit 220, learned for the day of the week on which the broadcast program that is the sponsorship credit display detection target is to be broadcast, are used as fixed values.

If the output value of the detection model is at least a predetermined threshold value, the sponsorship credit display segment estimation unit 260A determines that the input still image is a still image with the sponsorship credit display. When the output value of the detection model is less than the predetermined threshold value, the sponsorship credit display segment estimation unit 260A determines that the input still image is a still image without the sponsorship credit display. The sponsorship credit display segment estimation unit 260A performs the above-described determination for each still image continuous in time-series of the broadcast program that is the sponsorship credit display detection target, and generates a signal indicating the determination result (in the present embodiment, a binary time-series signal). The sponsorship credit display segment estimation unit 260A outputs a signal that is a signal "1" for a segment estimated to be a sponsorship credit display segment and outputs a signal that is a signal "0" for other segments to the output unit 140A. It should be noted that a configuration may be adopted in which the sponsorship credit display segment estimation unit 260A constructs a detection model for each day of the week to which the parameters learned by the learning unit 240A for each day of the week are applied, and a detection model is used that corresponds to the day of the week when the broadcast program that is the sponsorship credit display detection target is to be broadcast.

Generally, the same broadcast program is often broadcast on the same day every week. In such a broadcast program, a sponsorship credit display tends to be displayed in the same format. Therefore, according to the image recognition unit 200A, learning data is created for each day of the week, and the learning data is used to learn the parameters to be applied to the detection model for each day of the week, thereby improving the precision of detection of the sponsorship credit display. It should be noted that the present embodiment has been described using an example in which learning data creation and learning of parameters to be applied to the detection model are performed for each day of the week, but the present invention is not limited to this. For example, learning data creation and learning of parameters to be applied to the detection model may be performed separately on weekdays, Saturdays, and Sundays. Further, for example, learning data creation and learning of parameters to be applied to the detection model may be performed for each broadcast program.

Here, a configuration may be adopted in which the initial learning learning data creation unit 231A, based on the acquired time information, from the generated still images, extracts a still image with the sponsorship credit display and a still image without the sponsorship credit display as a pair with the time when the corresponding still image was broadcast, and outputs a pair of an extracted still image with the sponsorship credit display and the time when that still image was broadcast, and a pair of a still image without the sponsorship credit display and the time when that still image was broadcast, to the learning unit 240A as learning data for initial learning of the detection model. In this case, the initial learning unit 241A uses the learning data for initial learning created by the initial learning learning data creation unit 231A to learn the parameters to be applied to the detection model for detecting the sponsorship credit display in the broadcast program. Here, the learning data for initial learning includes a pair of a still image with the sponsorship credit display and the time when that still image was broadcast, and a pair of a still image without the sponsorship credit display and the time when that still image was broadcast.

Also, a configuration may be adopted in which the daily relearning learning data creation unit 232A, based on the acquired time information, from the generated still images, extracts a still image with the sponsorship credit display and a still image without the sponsorship credit display as a pair with the time when the corresponding still image was broadcast, and outputs a pair of a still image with the sponsorship credit display extracted for each day of the week and the time when that still image was broadcast, and a pair of a still image without the sponsorship credit display and the time when that still image was broadcast, to the learning unit 240A as relearning data for each day of the week. In this case, the daily relearning unit 242A uses the relearning data for each day of the week created by the daily relearning learning data creation unit 232A to learn the parameters to be applied to the detection model for detecting the sponsorship credit display in the broadcast program for each day of the week. Here, the relearning data for each day of the week includes, for each day of the week, a pair of the still image with the sponsorship credit display and the time when that still image was broadcast, and a pair of the still image without the sponsorship credit display and the time when that still image was broadcast. The daily relearning unit 242A stores the learned parameters in the parameter storage unit 220.

It should be noted that a configuration may also be adopted in which the learning data creation unit 230A does not distinguish between the days of the week, and creates, as learning data, a pair of a still image with the sponsorship credit display and the time when that still image was broadcast, and a pair of a still image without the sponsorship credit display and the time when that still image was broadcast. That is, a configuration may be adopted in which the learning data creation unit 230A creates, as the learning data, from the broadcast program in which the sponsorship credit display has been detected, a still image with the sponsorship credit display and the time when the still image was broadcast, and a still image without the sponsorship credit display and the time when the still image was broadcast. Also, the learning unit 240A may learn the parameters applied to the detection model using the learning data created by the learning data creation unit 230A without distinguishing the days of the week.

Generally, the same broadcast program is often broadcast in the same time zone on the same day every week. In such a broadcast program, a sponsorship credit display tends to be displayed in the same format. Therefore, by creating, as the learning data, a still image with the sponsorship credit display and the time when the still image was broadcast, and a still image without the sponsorship credit display and the time when the still image was broadcast, and learning the parameters applied to the detection model using that learning data, it is possible to further improve the precision of detection of the sponsorship credit display.

Voice Recognition Unit

Figure 12:
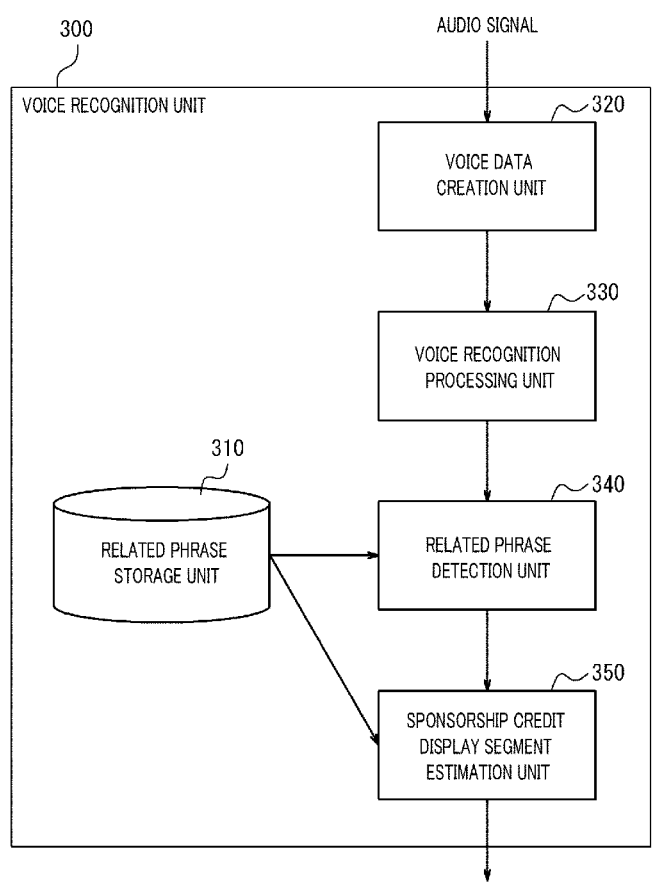
FIG. 12 shows an example configuration of a voice recognition unit in the sponsorship credit display detection device according to the second embodiment of the present invention.

Next, details of the voice recognition unit 300 will be described. FIG. 12 shows an example configuration of the voice recognition unit 300. The voice recognition unit 300 shown in FIG. 12 includes a related phrase storage unit 310, a voice data creation unit 320, a voice recognition processing unit 330, a related phrase detection unit 340, and a sponsorship credit display segment estimation unit 350.

The related phrase storage unit 310 stores related phrases that are included in an announcement of a sponsorship credit display (an announcement announced when the sponsorship credit is displayed) and are related to the sponsorship credit display. Examples of related phrases include phrases often included in announcements of sponsorship credit displays, such as "you see", "sponsor", "support", and "(is/was) broadcast". Further, as related phrases, there are phrases indicating a company name, for example.

Further, associated with a related phrase, the related phrase storage unit 310 stores an estimation period in which a predetermined period of at least one of before and after the appearance time of the related phrase is estimated as a sponsorship credit display segment. The estimation period of the related phrase is set according to the position where the related phrase is likely to appear in the announcement of the sponsorship credit display.

For example, as an announcement of the sponsorship credit display, the fixed phrase "This broadcast program was broadcast with the support of the sponsors you see" is often used. In such a fixed phrase, with Japanese word order, related phrases such as "broadcast program" and "you see" tend to appear in the first half of the announcement, related phrases such as "sponsor" and "support" tend to appear in the middle of the announcement, and related phrases such as "broadcast" tend to appear later in the announcement. The related phrase estimation period is set based on such a tendency.

For example, for the related phrase "broadcast program" that is likely to appear in the first half of the announcement, "0 seconds to +5 seconds" is set as the estimation period. Also, for the related phrase "support" that is likely to appear in the middle of the announcement, "−3 seconds to +2 seconds" is set as the estimation period. Also, for the related phrase "broadcast" that is likely to appear in the latter half of the announcement, "−4 seconds to +1 second" is set as the estimation period. Note that "−X seconds to +Y seconds" refers to a segment from X seconds before the appearance time of the related phrase to Y seconds after the appearance time of the related phrase.

The voice data creation unit 320 acquires the audio signal of the broadcast program that is the sponsorship credit display detection target from the broadcast video/audio signal storage unit 110. The video data creation unit 320 decodes the acquired audio signal and creates an audio signal for voice recognition in a predetermined format (for example, WAV format, 16 kHz, 16 bits, monaural audio signal) as voice data for voice recognition, and outputs this audio signal to the voice recognition processing unit 330.

The voice recognition processing unit 330 performs voice recognition on the voice data output from the voice data creation unit 320. Specifically, the voice recognition processing unit 330 stores parameters to be applied to a voice recognition acoustic model/language model tuned for detecting the sponsorship credit display. The voice recognition processing unit 330 uses the acoustic model/language model to which the stored parameters have been applied to perform voice recognition on the audio signal of the broadcast program that is the sponsorship credit display detection target, and outputs the results of voice recognition to the related phrase detection unit 340. It should be noted that the parameters to be applied to the acoustic model/language model may be stored in an unshown storage unit.

FIG. 13 shows an example of results of voice recognition by the voice recognition processing unit 330. FIG. 13 shows the results of voice recognition with respect to the audio signal of the phrase "We now will broadcast with the support of the sponsors you see".

As shown in FIG. 13, the voice recognition processing unit 330 divides a target phrase into a plurality of phrases ("Word Name") by voice recognition of an audio signal, and transcribes this as text data. Further, the voice recognition processing unit 330, in association with each phrase ("Word Name"), outputs an ID ("Word ID") for identifying the phrase, the start time of the phrase ("Word Start Time"), and the end time of the phrase ("Word End Time") as the results of speech recognition.

Referring to FIG. 12 again, the related phrase detection unit 340 detects a related phrase stored in the related phrase storage unit 310 from the results of speech recognition by the speech recognition processing unit 330, and outputs a signal (in the present embodiment, a binary time-series signal) indicating the detection results to the sponsorship credit display segment estimation unit 350. For example, the related phrase detection unit 340 outputs a signal "1" regarding the time when the related phrase was detected and a signal "0" regarding the other times to the sponsorship credit display segment estimation unit 350. The related phrase detection unit 340 performs the above-described processing at predetermined time intervals. Therefore, for example, when the broadcast program that is the sponsorship credit display detection target is 65 minutes and the above-described processing is performed at 1-second intervals, the related phrase detection unit 340 outputs a binary time-series signal in which there are 3900 continuous instances of the signal "1" or the signal "0" in time-series to the sponsorship credit display segment estimation unit 350.

The sponsorship credit display segment estimation unit 350 estimates the sponsorship credit display segment based on the binary time-series signal output from the related phrase detection unit 340. Specifically, the sponsorship credit display segment estimation unit 350, using the appearance time of the detected related phrase (the time corresponding to the signal "1") as a starting point, estimates a period corresponding to the estimation period stored in the related phrase storage unit 310 in association with the detected related phrase as the sponsorship credit display segment. For example, assume that "−X seconds to +Y seconds" is set as the estimation period in association with a certain related phrase, and the related phrase is was detected at time t. In this case, the sponsorship credit display segment estimation unit 350, using the time t as the start point, estimates a time interval from time t−X to time t+Y as the sponsorship credit display segment. It should be noted that the sponsorship credit display segment estimation unit 350 outputs the results of voice recognition by the voice recognition processing unit 330 from the voice recognition processing unit 330 or from the related phrase detection unit 340. The sponsorship credit display segment estimation unit 350 acquires the results of voice recognition by the voice recognition processing unit 330, and therefore is able to specify the corresponding related phrase for the signal "1" included in the binary time-series signal.

The sponsorship credit display segment estimation unit 350 outputs a signal indicating the estimation result of the sponsorship credit display segment (in the present embodiment, a binary time-series signal) to the output unit 140A. The sponsorship credit display segment estimation unit 350 performs the above-described processing at predetermined time intervals. Therefore, for example, when the broadcast program that is the sponsorship credit display detection target is 65 minutes and the above-described processing is performed at 1-second intervals, the sponsorship credit display segment estimation unit 350 outputs a binary time-series signal in which there are 3900 continuous instances of 1-bit signals in time-series to the output unit 140A.

When a related phrase appears outside the sponsorship credit display segment in the broadcast program, the sponsorship credit display segment estimation unit 350 outputs a signal "1". However, in this case, if a related phrase does not appear before or after that phrase, the period in which the signal "1" is output is only the period corresponding to the estimation period associated with the related phrase. On the other hand, in the sponsorship credit display segment, related phrases usually appear continuously, and have a length of, for example, about several tens of seconds. Therefore, by detecting a segment in which the signal "1" continues for at least a predetermined time as the sponsorship credit display segment, the output unit 140A can detect the sponsorship credit display segment with high precision.

Sponsorship Credit Display Detection Method

Figure 14:
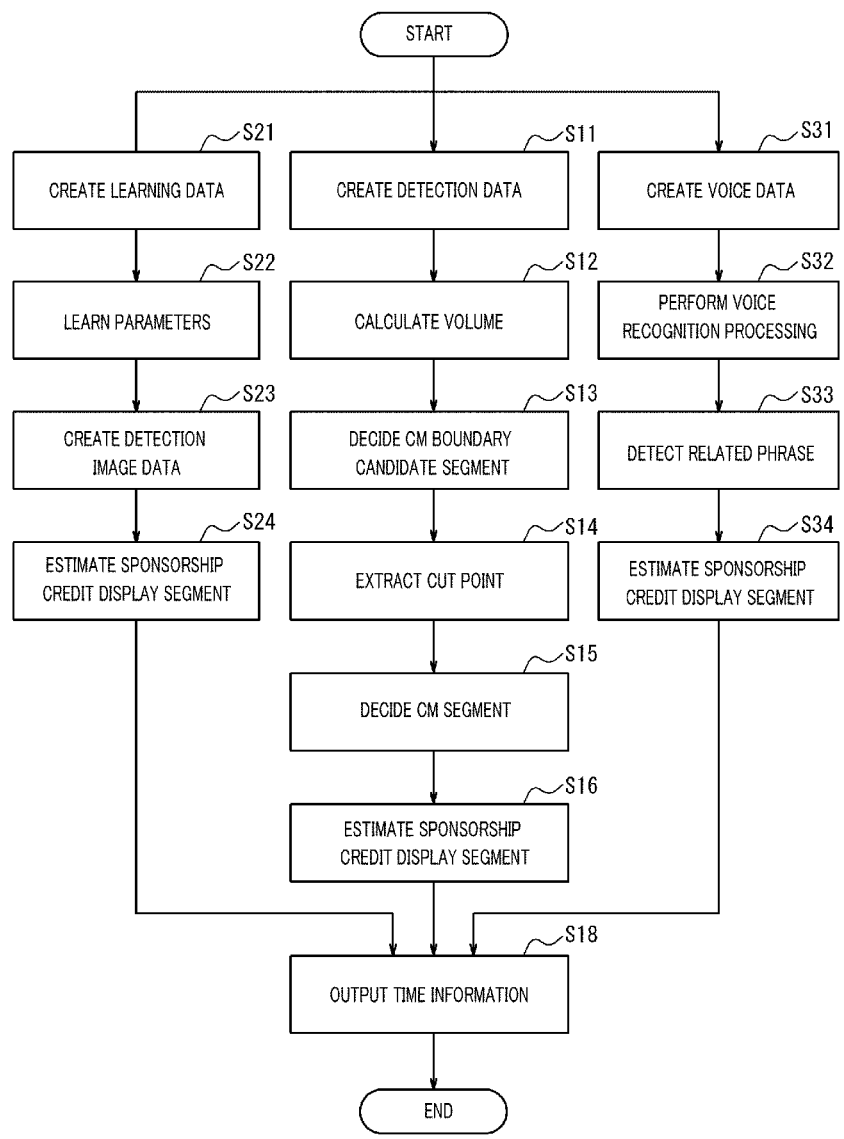
FIG. 14 is a flowchart showing an example of a sponsorship credit display detection method according to the second embodiment of the present invention.

Next, a sponsorship credit display detection method according to the sponsorship credit display detection device 100A will be described with reference to FIG. 14. FIG. 14 is a flowchart showing an example of a sponsorship credit display detection method according to the second embodiment of the present invention. Steps S11 to S16 are the same as those in the first embodiment, so a description thereof will be omitted here.

In step S21, the learning data creation unit 230 creates, as learning data, a still image with the sponsorship credit display and a still image without the sponsorship credit display from the video signal of the broadcast program in which the sponsorship credit display has been detected.

In step S22, the learning unit 240 uses the learning data created in step S21 to learn the parameters to be applied to the detection model for detecting the sponsorship credit display in the broadcast program.

In step S23, the detection image data creation unit 250 decodes the video signal of the broadcast program that is the sponsorship credit display detection target, and creates still images that are continuous in time-series at predetermined time intervals as detection image data.

In step S24, the sponsorship credit display segment estimation unit 260 estimates the sponsorship credit display segment in the broadcast program that is the sponsorship credit display detection target using the detection model to which the parameters learned in step S23 were applied.

In step S31, the voice data creation unit 320 creates voice data for voice recognition from the audio signal of the broadcast program that is the sponsorship credit display detection target.

In step S32, the voice recognition processing unit 330 performs voice recognition processing on the voice data created in step S31.

In step S33, the related phrase detection unit 340 detects a related phrase related to the sponsorship credit display from the results of voice recognition obtained in step S32.

In step S34, the sponsorship credit display segment estimation unit 350 estimates the sponsorship credit display segment based on the related phrase detected in step S33.

It should be noted that the processing of steps S11 to S16, the processing of steps S21 to S24, and the processing of steps S31 to S34 may be performed in parallel, or any of them may be performed first.

In step S18, the output unit 140A detects time information of segments that continue for at least a predetermined time period, from among segments obtained by a union or a common portion with the sponsorship credit display segment estimated in step S16, the sponsorship credit display segment estimated in step S24, and the sponsorship credit display segment estimated in step S34. For example, when it is desired to detect sponsorship credit display segments without any omission, a union is set as a sponsorship credit display segment, and when it is desired to reduce the false detection rate of sponsorship credit display segments as much as possible, a common portion is set as a sponsorship credit display segment.

As described above, in the second embodiment, the image recognition unit 200 detects the sponsorship credit display in the broadcast program that is the sponsorship credit display detection target using the detection model to which the parameters learned using learning data in advance have been applied. Therefore, according to the second embodiment of the present invention, by using sponsorship credit displays of various variations as the learning data, it is possible to detect sponsorship credit displays in various variations as described above. Therefore, by using the voice recognition unit 300, it is possible to further improve the precision of detection of sponsorship credit displays even more than in the first embodiment.

Further, in the second embodiment, the voice recognition unit 300 estimates the estimation period before and after a related phrase detected by the voice recognition processing as a sponsorship credit display segment. Therefore, it is possible to detect only a segment in which a related phrase continuously appears as a sponsorship credit display segment. In the broadcast program, a related phrase may appear outside a sponsorship credit display segment, but since a related phrase rarely appears continuously outside a sponsorship credit display segment, this related phrase is not related to a sponsorship credit display. Therefore, even if this related phrase appears, it is not detected as a sponsorship credit display segment, and only a segment in which a related phrase continuously appears when the sponsorship credit is displayed is detected as a sponsorship credit display segment. Therefore, by using the voice recognition unit 300, it is possible to further improve the precision of detection of sponsorship credit displays even more than in the first embodiment.

Figure 15:
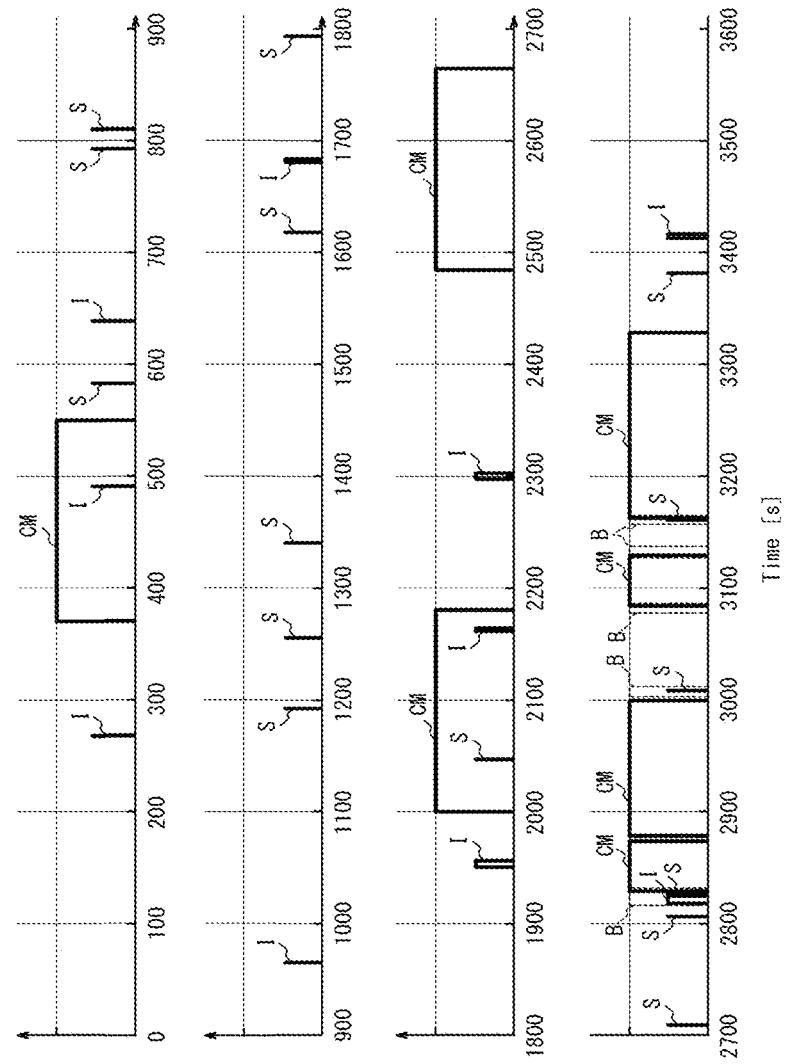
FIG. 15 shows an example of results of detection of sponsorship credit display segments.

FIG. 15 shows an example of results of detection of sponsorship credit display segments in a broadcast program. In FIG. 15, the horizontal axis represents time (seconds). In FIG. 15, a rise with the letter "I" at each time indicates times estimated to be sponsorship credit display segments by the image recognition unit 200, and a rise with the letter "S" indicates times estimated to be sponsorship credit display segments by the voice recognition unit 300. Further, segments with the letters "CM" indicate CM segments detected by the CM segment detection unit 120, and segments with the letter "B" indicate actual sponsorship credit display segments.

As can also be understood from FIG. 15, estimation of sponsorship credit display segments by CM segment detection, estimation of sponsorship credit display segments by voice recognition, and estimation of sponsorship credit display segments by image recognition are performed, and by detecting sponsorship credit display segments by combining these estimation results, it is possible to detect sponsorship credit display segments without any omission and with higher precision.

Although the sponsorship credit display detection devices 100 and 100A were described above, it is also possible to use a computer to function as the sponsorship credit display detection devices 100 and 100A. In such a computer, a computer program describing processing content that realizes each function of the sponsorship credit display detection devices 100, 100A, and 100B is stored in a storage unit of the computer, and these functions can be realized by a CPU of the computer reading and executing this computer program.

Also, the computer program may be recorded on a computer-readable recording medium. The computer program can be installed in a computer by using such a recording medium. In this case, the recording medium on which the computer program is recorded may be a non-transitory recording medium. The non-transitory recording medium is not particularly limited, but may be a recording medium such as a CD-ROM or a DVD-ROM, for example.

The above embodiments have been described as typical examples, but it will be obvious to those skilled in the art that many modifications and substitutions are possible within the spirit and scope of the present invention. Accordingly, the present invention should not be interpreted as being limited by the above-described embodiments, and various modifications and changes can be made without departing from the scope of the claims. For example, a plurality of constituent blocks described in the configuration figures of the embodiments can be combined into one constituent block, or one constituent block can be divided into a plurality of constituent blocks.

REFERENCE SIGNS LIST

100, 100A Sponsorship credit display detection device
110 Broadcast video/audio signal storage unit
120 CM segment detection unit
121 Detection data creation unit
122 Volume calculation unit
123 CM boundary candidate segment decision unit
124 Cut point extraction unit
125 CM segment decision unit
130 Sponsorship credit display segment estimation unit
140, 140A Output unit
200 Image recognition unit
210 Correct answer metadata storage unit
220 Parameter storage unit
230, 230A Learning data creation unit
231A Initial learning learning data creation unit
232A Daily relearning learning data creation unit
240, 240A Learning unit
241A Initial learning unit
242A Daily relearning unit
250 Detection image data creation unit
260, 260A Sponsorship credit display segment estimation unit
300 Voice recognition unit
310 Related phrase storage unit
320 Voice data creation unit
330 Voice recognition processing unit
340 Related phrase detection unit
350 Sponsorship credit display segment estimation unit

The invention claimed is:

1. A sponsorship credit display detection device for detecting, in a broadcast program, a sponsorship credit display that displays a sponsor of the broadcast program, the device comprising a processor configured to execute a method comprising:
   extracting cut points, wherein each of the cut points includes a point of time when a frame of a plurality of frames indicating an audio volume of the broadcast program is less than a predetermined audio volume threshold value and an amount of change of pixel values from a preceding frame of the frame to the frame being at least a pixel change threshold value;
   detecting, based on a predefined commercial message (CM) time length and a time interval between the extracted cut points, a CM segment in the plurality of frames;
   identifying a first sponsorship credit display segment in the plurality of frames, wherein the first sponsorship credit display segment starts and ends at points of time either before or after at least one continuous CM segment in the plurality of frames, wherein the at least one continuous CM segment includes the CM segment, the first sponsorship credit display segment includes indication of the sponsor associated with at least one CM segment in the at least one continuous CM segment, and the first sponsorship credit display segment is distinct from the at least one continuous CM segment; and
   outputting information associated with the first sponsorship credit display segment.

2. The sponsorship credit display detection device according to claim 1, the processor further configured to execute a method comprising:
   when detecting a plurality of low audio volume segments where the audio volume is less than the predetermined audio volume threshold value and a time interval between a pair of low audio volume segments and the predefined CM time length is less than an error threshold value, determining a segment obtained by adding a predetermined time period before and after a low volume segment as a CM boundary candidate segment;
   extracting a cut point within the CM boundary candidate segment;
   selecting the cut point for each CM boundary candidate segment based on a predetermined time range value and a difference of a time interval between two cut points from the predefined CM time length; and
   determining that a segment of frames between the selected cut points corresponds to a CM segment.

3. The sponsorship credit display detection device according to claim 1, the processor further configured to execute a method comprising:
   using a detection model, estimating a second sponsorship credit display segment in the broadcast program for which the sponsorship credit display has not been detected, wherein a parameter to be applied to the detection model has been learned in advance using, in a learning broadcast program in which the sponsorship credit display has been detected, learning data including a still image in which the sponsorship credit display is displayed and a still image in which the sponsorship credit display is not displayed; and
   outputting information indicating a common portion or a union of the first sponsorship credit display segment and the second sponsorship credit display segment.

4. The sponsorship credit display detection device according to claim 1, the processor further configured to execute a method comprising:
   detecting, based on results of voice recognition of an audio signal of the broadcast program, a related phrase associated with the sponsorship credit display included in an announcement of the sponsorship credit display;
   estimating a predetermined period as a third sponsorship credit display segment using an appearance time of the related phrase as a start point; and outputting information indicating a common portion of the first sponsorship credit display segment and the third sponsorship credit display segment.

5. The sponsorship credit display detection device according to claim 1, the processor further configured to execute a method comprising:
    using a detection model, estimating a second sponsorship credit display segment in the broadcast program for which the sponsorship credit display has not been detected;
    from results of voice recognition of an audio signal of the broadcast program, detect, based on from results of voice recognition of the audio signal of the broadcast program, a related phrase associated with the sponsorship credit display included in an announcement of the sponsorship credit display;
    estimating a predetermined period as a third sponsorship credit display segment using an appearance time of the related phrase as a start point,
    wherein a parameter to be applied to the detection model has been learned in advance using, in a learning broadcast program in which the sponsorship credit display has been detected, learning data including a still image in which the sponsorship credit display is displayed and a still image in which the sponsorship credit display is not displayed; and
    outputting information indicating a common portion of the first sponsorship credit display segment, the second sponsorship credit display segment, and the third sponsorship credit display segment.

6. The sponsorship credit display detection device according to claim 2, the processor further configured to execute a method comprising:
    generating a plurality of cut point series including a combination of cut points including one cut point selected from each of a plurality of CM boundary candidate segments;
    determining a series of cut points based on minimizing a sum of differences between time segments formed by adjacent cut points in the combination of cut points; and
    determining the segment of frames between the cut points of the series of cut points as the CM segment.

7. The sponsorship credit display detection device according to claim 2, the processor further configured to execute a method comprising:
    detecting, based on results of voice recognition of an audio signal of the broadcast program, a related phrase associated with the sponsorship credit display included in an announcement of the sponsorship credit display;
    estimating a predetermined period as a third sponsorship credit display segment using an appearance time of the related phrase as a start point; and
    outputting information indicating a common portion of the first sponsorship credit display segment and the third sponsorship credit display segment.

8. The sponsorship credit display detection device according to claim 2, the processor further configured to execute a method comprising:
    using a detection model, estimating a second sponsorship credit display segment in the broadcast program for which the sponsorship credit display has not been detected;
    identifying, based on results of voice recognition of an audio signal of the broadcast program, a related phrase associated with the sponsorship credit display included in an announcement of the sponsorship credit display;
    estimating a predetermined period as a third sponsorship credit display segment using an appearance time of the related phrase as a start point,
    wherein a parameter to be applied to the detection model has been learned in advance using, in a learning broadcast program in which the sponsorship credit display has been detected, learning data including a still image in which the sponsorship credit display is displayed and a still image in which the sponsorship credit display is not displayed; and
    outputting information including a common portion or a union of the first sponsorship credit display segment, the second sponsorship credit display segment, and the third sponsorship credit display segment.

9. A method for detecting, in a broadcast program, a sponsorship credit display that displays a sponsor of that broadcast program, the method comprising:
    extracting cut points, wherein each of the cut points includes a point of time when a frame of a plurality of frames indicating an audio volume of the broadcast program is less than a predetermined audio volume threshold value and an amount of change from a preceding frame of the frame to the frame is at least a pixel change threshold value;
    detecting, based on a predetermined commercial message (CM) time length and a time interval between the extracted cut points, a CM (CM) segment in the plurality of frames;
    identifying a first sponsorship credit display segment in the plurality of frames, wherein the first sponsorship credit display segment starts and ends at points of time either before or after at least one continuous CM segment in the plurality of frames, wherein the at least one continuous CM segment includes the CM segment, the first sponsorship credit display segment includes indication of the sponsor associated with at least one CM segment in the at least one continuous CM segment, and the first sponsorship credit display segment is distinct from the at least one continuous CM segment; and
    providing information indicating the first sponsorship credit display segment.

10. The method according to claim 9, the method further comprising:
    when detecting a plurality of low audio volume segments where the audio volume is less than the predetermined audio volume threshold value and a time interval between a pair of low audio volume segments and the predefined CM time length is less than an error threshold value, determining a segment obtained by adding a predetermined time period before and after a low volume segment as a CM boundary candidate segment;
    extracting a cut point within the CM boundary candidate segment;
    selecting the cut point for each CM boundary candidate segment based on a predetermined time range value and a difference of a time interval between two cut points from the predefined CM time length; and
    determining that a segment of frames between the selected cut points corresponds to a CM segment.

11. The method according to claim 10, the method further comprising:
    generating a plurality of cut point series including a combination of cut points including one cut point selected from each of a plurality of CM boundary candidate segments;

deciding a series of cut points based on minimizing a sum of differences between time segments formed by adjacent cut points in the combination of cut points; and determining the segment of frames between the cut points of the series of cut points as the CM segment.

12. The method according to claim 11, the method further comprising:

using a detection model, estimating a second sponsorship credit display segment in the broadcast program for which the sponsorship credit display has not been detected, wherein a parameter to be applied to the detection model has been learned in advance using, in a learning broadcast program in which the sponsorship credit display has been detected, learning data including a still image in which the sponsorship credit display is displayed and a still image in which the sponsorship credit display is not displayed; and outputting information indicating a common portion or a union of the first sponsorship credit display segment and the second sponsorship credit display segment.

13. The method according to claim 11, the method further comprising:

detecting, based on results of voice recognition of an audio signal of the broadcast program, a related phrase associated with the sponsorship credit display included in an announcement of the sponsorship credit display;

estimating a predetermined period as a third sponsorship credit display segment using an appearance time of the related phrase as a start point; and outputting information indicating a common portion of the first sponsorship credit display segment and the third sponsorship credit display segment.

14. The method according to claim 11, the method further comprising:

estimating, using a detection model, a second sponsorship credit display segment in the broadcast program for which the sponsorship credit display has not been detected;

from results of voice recognition of an audio signal of the broadcast program, detecting a related phrase related to the sponsorship credit display included in an announcement of the sponsorship credit display;

estimating a predetermined period as a third sponsorship credit display segment using an appearance time of the related phrase as a start point, wherein a parameter to be applied to the detection model has been learned in advance using, in a learning broadcast program in which the sponsorship credit display has been detected, learning data including a still image in which the sponsorship credit display is displayed and a still image in which the sponsorship credit display is not displayed; and outputting information including at least one of:

a common portion or a union of the first sponsorship credit display segment, the second sponsorship credit display segment, and the third sponsorship credit display segment.

15. A computer-readable non-transitory recording medium storing computer-executable program instructions that when executed by a processor cause a computer system to execute a method comprising:

extracting cut points, wherein each of the cut points includes a point of time when a frame of a plurality of frames indicating an audio volume of a broadcast program is less than an audio volume threshold value and an amount of change of pixel values from a preceding frame of the frame to the frame being at least a pixel change threshold value;

detecting, based on a predetermined commercial message (CM) time length and a time interval between the extracted cut points, a CM segment in the plurality of frames;

identifying a first sponsorship credit display segment associated with a sponsorship credit display detected in the plurality of frames, wherein the first sponsorship credit display segment starts and ends at points of time either before or after at least one continuous CM segment in the plurality of frames, wherein the at least one continuous CM segment includes the CM segment, the first sponsorship credit display segment includes indication of a sponsor associated with at least one CM segment in the at least one continuous CM segment, and the first sponsorship credit display segment is distinct from the at least one continuous CM segment; and outputting information associated with the first sponsorship credit display segment.

16. The computer-readable non-transitory recording medium according to claim 15, the computer-executable program instructions when executed further causing the computer system to execute a method comprising:

when detecting a plurality of low audio volume segments where the audio volume is less than the predetermined volume threshold value and a time interval between a pair of low audio volume segments and the predefined CM time length is less than an error threshold value, determining a segment obtained by adding a predetermined time period before and after a low volume segment as a CM boundary candidate segment;

extracting a cut point within the CM boundary candidate segment;

selecting the cut point for each CM boundary candidate segment based on a predetermined time range value and a difference of a time interval between two cut points from the predefined CM time length; and determining that a segment of frames between the selected cut points corresponds to a CM segment.

17. The computer-readable non-transitory recording medium according to claim 15, the computer-executable program instructions when executed further causing the computer system to execute a method comprising:

generating a plurality of cut point series including a combination of cut points including one cut point selected from each of a plurality of CM boundary candidate segments, determining a series of cut points based on minimizing a sum of differences between time segments formed by adjacent cut points in the combination of cut points; and determining a segment of frames between the cut points of the series of cut points as the CM segment.

18. The computer-readable non-transitory recording medium according to claim 15, the computer-executable program instructions when executed further causing the computer system to execute a method comprising:

using a detection model, estimating a second sponsorship credit display segment in the broadcast program for which the sponsorship credit display has not been detected, wherein a parameter to be applied to the detection model has been learned in advance using, in a learning broadcast program in which the sponsorship credit display has been detected, learning data including a still image in which the sponsorship credit display is displayed and a still image in which the sponsorship credit display is not displayed; and outputting information indicating a common portion or a union of the first sponsorship credit display segment and the second sponsorship credit display segment.

19. The computer-readable non-transitory recording medium according to claim 15, the computer-executable program instructions when executed further causing the computer system to execute a method comprising:

detecting, based on results of voice recognition of an audio signal of the broadcast program, a related phrase associated with the sponsorship credit display included in an announcement of the sponsorship credit display;

estimating a predetermined period as a third sponsorship credit display segment using an appearance time of the related phrase as a start point; and outputting information indicating a common portion or a union of the first sponsorship credit display segment and the third sponsorship credit display segment.

20. The computer-readable non-transitory recording medium according to claim 15, the computer-executable program instructions when executed further causing the computer system to execute a method comprising:

using a detection model, estimating a second sponsorship credit display segment in the broadcast program for which the sponsorship credit display has not been detected;

identifying, based on results of voice recognition of an audio signal of the broadcast program, a related phrase associated with the sponsorship credit display included in an announcement of the sponsorship credit display;

estimating a predetermined period as a third sponsorship credit display segment using an appearance time of the related phrase as a start point, wherein a parameter to be applied to the detection model has been learned in advance using, in a learning broadcast program in which the sponsorship credit display has been detected, learning data including a still image in which the sponsorship credit display is displayed and a still image in which the sponsorship credit display is not displayed; and outputting information including a common portion or a union of the first sponsorship credit display segment, the second sponsorship credit display segment, and the third sponsorship credit display segment.

* * * * *